(12) United States Patent
Zhang et al.

(10) Patent No.: US 10,674,515 B2
(45) Date of Patent: Jun. 2, 2020

(54) USER EQUIPMENT AND BASE STATION IN WIRELESS COMMUNICATIONS SYSTEM, AND WIRELESS COMMUNICATIONS METHOD

(71) Applicant: SONY CORPORATION, Tokyo (JP)

(72) Inventors: Yuan Zhang, Nanjing (CN); Penshun Lu, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/083,401

(22) PCT Filed: Feb. 24, 2017

(86) PCT No.: PCT/CN2017/074777
§ 371 (c)(1),
(2) Date: Sep. 7, 2018

(87) PCT Pub. No.: WO2017/152779
PCT Pub. Date: Sep. 14, 2017

(65) Prior Publication Data
US 2019/0090228 A1 Mar. 21, 2019

(30) Foreign Application Priority Data
Mar. 9, 2016 (CN) .......................... 2016 1 0136197

(51) Int. Cl.
*H04W 72/04* (2009.01)
*H04W 4/02* (2018.01)
*H04W 4/80* (2018.01)
*H04W 72/12* (2009.01)
*H04W 76/15* (2018.01)
*H04W 24/08* (2009.01)
*H04W 40/24* (2009.01)

(52) U.S. Cl.
CPC .......... *H04W 72/048* (2013.01); *H04W 4/02* (2013.01); *H04W 4/80* (2018.02); *H04W 24/08* (2013.01);
(Continued)

(58) Field of Classification Search
CPC ......... H04W 4/02; H04W 4/80; H04W 76/15; H04W 24/08
See application file for complete search history.

(56) References Cited

U.S. PATENT DOCUMENTS

2006/0166683 A1  7/2006  Sharma et al.
2009/0023460 A1*  1/2009  Cho ........................ H04W 4/08
                                              455/456.2
(Continued)

FOREIGN PATENT DOCUMENTS

CN    103209492 A    7/2013
CN    103957518 A    7/2014
CN    105122919 A    12/2015

OTHER PUBLICATIONS

English-language translation of International Search Report and Written Opinion for International Application No. PCT/CN2017/074777, dated May 4, 2017.

*Primary Examiner* — Gary Mui
(74) *Attorney, Agent, or Firm* — XSENSUS LLP

(57) ABSTRACT

Disclosed are a user equipment and a base station in a wireless communications system, and a wireless communications method. The user equipment is used as a receiving-end user equipment for D2D communications, comprising: a transceiver; and one or more processing circuits configured to: cause the transceiver to receive a beacon signal sent by a sending-end user equipment for D2D communications, and decode the received beacon signal, wherein the beacon signal comprises identification information for identifying a D2D link where the sending-end user equipment is located; identify the D2D link where the sending-end user equipment is located as a neighbor D2D link of the receiving-end user equipment on the basis of the identification information in the correctly decoded beacon signal; and cause the transceiver to send the identified neighbor D2D link to a base
(Continued)

station in a wireless communications system. By using the user equipment, the base station and the wireless communications method of the present application, a neighbor D2D link of the user equipment can be determined without obtaining the location information of the user equipment, so that resources can be allocated more reasonably.

20 Claims, 12 Drawing Sheets

(52) U.S. Cl.
CPC ..... *H04W 40/244* (2013.01); *H04W 72/1226* (2013.01); *H04W 76/15* (2018.02)

(56) References Cited

U.S. PATENT DOCUMENTS

| | | | |
|---|---|---|---|
| 2013/0077578 A1* | 3/2013 | Wang | H04W 72/1278 370/329 |
| 2013/0170470 A1* | 7/2013 | Kneckt | H04W 48/08 370/330 |
| 2014/0204898 A1* | 7/2014 | Yang | H04W 8/005 370/330 |
| 2014/0219095 A1* | 8/2014 | Lim | H04W 72/085 370/235 |
| 2015/0049732 A1* | 2/2015 | Xue | H04L 1/1854 370/330 |
| 2015/0105113 A1* | 4/2015 | Lee | H04W 76/11 455/500 |
| 2015/0131571 A1* | 5/2015 | Fodor | H04W 4/70 370/329 |
| 2015/0382390 A1 | 12/2015 | Wong et al. | |
| 2016/0014589 A1* | 1/2016 | Niu | H04W 74/02 370/329 |
| 2016/0044686 A1* | 2/2016 | Lindoff | H04W 72/0406 370/329 |
| 2016/0066351 A1 | 3/2016 | Zhao et al. | |
| 2016/0095092 A1* | 3/2016 | Khoryaev | H04W 76/14 370/329 |
| 2016/0113021 A1 | 4/2016 | Yuan | |
| 2016/0270106 A1* | 9/2016 | Zhou | H04W 4/70 |
| 2016/0323923 A1* | 11/2016 | Wei | H04W 74/006 |

* cited by examiner

USER EQUIPMENT AND BASE STATION IN WIRELESS COMMUNICATIONS SYSTEM, AND WIRELESS COMMUNICATIONS METHOD

The present application claims the priority to Chinese Patent Application No. 201610136197.0, titled "USER EQUIPMENT AND BASE STATION IN WIRELESS COMMUNICATIONS SYSTEM, AND WIRELESS COMMUNICATIONS METHOD", filed on Mar. 9, 2016 with the Chinese State Intellectual Property Office, which is incorporated herein by reference in its entirety.

FIELD

The present disclosure relates to the technical field of wireless communications, and in particular to a user equipment and a base station for performing device-to-device (D2D) communication in a wireless communication system and a method for performing D2D communication in a wireless communication system.

BACKGROUND

This part provides background information related to the present disclosure, which is not necessarily the conventional technology.

With the explosive increase of user data, the requirements for the data transmission rate and the data transmission efficiency are improved, and the communication load between a user and a base station is increased. Under such background, the D2D communication technology has been developed. The D2D communication technology represents an information transmission manner in which cellular communication user equipments directly exchange data in the terminal direct communication way. As compared with the traditional cellular communication technology, the D2D communication technology has features of reusing spectrum resources, having short transmission distances, and transmitting information not via a base station. Therefore, with the D2D communication technology, the spectrum utilization can be increased, the transmitting power of the user equipment and the load of the base station can be reduced, and the signal has a better performance due to the short communication distance, thereby facilitating to reduce the communication interference to other devices.

The D2D communication includes two processes, i.e., a link mutual discovery process and a data transmission process. The discovery process is mainly intended to determine which users are in the vicinity of a user. The discovery process may be performed by two manners including a distributed manner and a centralized manner. In the distributed manner, users automatically select radio resources from a resource pool for signal transmission in the discovery process. In a case that some users close to each other selects the same resource block, a conflict occurs during the signal transmission. In the centralized manner, the resource configuration is performed semi-statically according to the users. The data transmission process is mainly intended to configure resources for D2D links and transmit data via the links. The data transmission process may also be performed by two manners including a distributed manner and a centralized manner. In the distributed manner, the users select resources from the resource pool to transmit data and control information, and a conflict may occur in this manner. In the centralized manner, the resource configuration for the users is performed by the base station to cause the users to transmit data and control information.

The current D2D research mainly focuses on a public safety scenarios. However, the D2D links cannot be only applied in the scenarios. In a dense non-public security scenario, hundreds or thousands of users perform the D2D communication simultaneously via mobile phones or laptops. The requirements of the dense non-public security scenarios are different from those of the public safety scenarios. For the public security scenarios, a high reliability and a low complexity are the most important factors. For the dense non-public security scenarios, it should be ensured that a user can perform convenient and effective D2D communication in a case that many other users exist in the vicinity of the user, that is, the effectiveness and the user capacity are highly required. In the distributed manner and the centralized manner of the data transmission process described above, since a conflict easily occurs in the distributed manner, the centralized manner is more applicable in the dense non-public security scenarios.

In the dense non-public security scenarios, an appropriate scheduling method should be adopted to ensure the effectiveness of the D2D communication and the user capacity. A perfect scheduling method should meet the following two criteria: 1) avoiding that two D2D links that are interfered by each other simultaneously transmit information; and 2) allowing that two D2D links that are not interfered by each other simultaneously transmit information. In order to meet the above criteria, the base station is required to acquire specific information on whether any two D2D links are interfered by each other. In the current research, which D2D links that are not interfered by each other to simultaneously perform the communication can be determined based on the locations of the users, with a geographic location-based scheduling method.

In the geographic location-based scheduling method, a problem how to acquire the specific location information of each user equipment is caused. In a case that a GPS or other similar methods is used, the following problems may be caused. 1) A user is required to be able to acquire its own geographic location information. 2) The base station is required to acquire location information of the user equipment. 3) The location information is not accurate enough in environments such as an indoor environment. 4) The accuracy of the acquired geographic location is in the order of tens of meters, which meets the navigation requirements but is insufficient for scheduling. Therefore, in the geographic location-based scheduling method, it is difficult to accurately acquire the location information of the user equipment, so that the determined D2D links that are interfered by each other and the determined D2D links that are not interfered by each other are not accurate enough, and thus the scheduling performed by the base station is not reasonable enough.

In view of the above technical problems, it is desired to provide a solution to accurately determine the D2D links that are not interfered by each other and the D2D links that are not interfered by each other without acquiring the geographic position of the user equipment, thereby more reasonably configuring resources, and thus improving the effectiveness of the D2D communication and the system capacity.

SUMMARY

This part provides an overview of the present disclosure, rather than a full scope or all features of the present disclosure.

An object of the present disclosure is to provide a user equipment and a base station in a wireless communication system and a method for performing wireless communication in a wireless communication system, so that the base station can more accurately acquire a neighbor D2D link of the user equipment, thereby more reasonably configuring resources, and thus improving the effectiveness of the D2D communication and the system capacity.

According to an aspect of the present disclosure, there is provided a user equipment for performing device-to-device D2D communication in a wireless communication system. The wireless communication system includes a plurality of D2D links, and the user equipment is used as a receiving end user equipment of a D2D link. The receiving end user equipment includes a transceiver and one or more processing circuits. The processing circuit is configured to: cause the transceiver to receive a beacon signal transmitted by a transmitting end user equipment performing the D2D communication in the wireless communication system, and decode the received beacon signal, where the beacon signal includes identification information for identifying a D2D link where the transmitting end user equipment is located; identify the D2D link where the transmitting end user equipment is located as a neighbor D2D link of the receiving end user equipment, based on the identification information in the beacon signal that is decoded correctly; and cause the transceiver to transmit the identified neighbor D2D link to a base station in the wireless communication system.

According to another aspect of the present disclosure, there is provided a user equipment for performing device-to-device D2D communication in a wireless communication system. The wireless communication system includes a plurality of D2D links, and the user equipment is used as a transmitting end user equipment of a D2D link. The transmitting end user equipment includes a transceiver and one or more processing circuits. The processing circuit is configured to: cause the transceiver to transmit a beacon signal to a receiving end user equipment performing the D2D communication in the wireless communication system. The beacon signal includes identification information for identifying a D2D link where the transmitting end user equipment is located.

According to another aspect of the present disclosure, there is provided a base station for performing device-to-device D2D communication in a wireless communication system. The wireless communication system includes a plurality of D2D links. The base station includes a transceiver and one or more processing circuits. The processing circuit is configured to: cause the transceiver to receive a neighbor D2D link of each of the D2D links identified by a receiving end user equipment of each of the D2D links in the wireless communication system; and configure, based on the received neighbor D2D links, resources for the receiving end user equipment and a transmitting end user equipment of each of the D2D links, for the D2D communication.

According to another aspect of the present disclosure, there is provided a method for performing device-to-device D2D communication in a wireless communication system. The wireless communication system includes a plurality of D2D links. The method includes: receiving a beacon signal transmitted by a transmitting end user equipment performing the D2D communication in the wireless communication system, and decoding the received beacon signal, where the beacon signal includes identification information for identifying a D2D link where the transmitting end user equipment is located; identifying the D2D link where the transmitting end user equipment is located as a neighbor D2D link of a receiving end user equipment, based on the identification information in the beacon signal that is decoded correctly; and transmitting the identified neighbor D2D link to a base station in the wireless communication system.

According to another aspect of the present disclosure, there is provided a method for performing device-to-device D2D communication in a wireless communication system. The wireless communication system includes a plurality of D2D links. The method includes: transmitting a beacon signal to a receiving end user equipment performing the D2D communication in the wireless communication system. The beacon signal includes identification information for identifying a D2D link where a transmitting end user equipment is located.

According to another aspect of the present disclosure, there is provided a method for performing device-to-device D2D communication in a wireless communication system. The wireless communication system includes a plurality of D2D links. The method includes: receiving a neighbor D2D link of each receiving end user equipment identified by the receiving end user equipment of each of the D2D links; determining a neighbor D2D link of each of the D2D links based on the received neighbor D2D link of each receiving end user equipment; and configuring, based on the neighbor D2D link of each of the D2D links, resources for the receiving end user equipment and a transmitting end user equipment of each of the D2D links, for the D2D communication.

With the user equipment and the base station in the wireless communication system and the wireless communication method in the wireless communication system according to the present disclosure, the user equipment acquires a beacon signal transmitted by a resource block in a resource pool, and identifies the neighbor D2D link of the user equipment based on the beacon signal that is decoded correctly, and the user equipment transmits the identified neighbor D2D link to the base station. Therefore, the base station can more accurately determine the neighbor D2D link of the user equipment without acquiring the geographic location of the user equipment, thereby reasonably configuring resources based on the neighbor D2D links of all the user equipments, and thus improving the effectiveness of the D2D communication and the system capacity.

Further applicability range is apparent from the description provided herein. The description and specific examples in the overview are merely for the purpose of illustration and are not intended to limit the scope of the present disclosure.

BRIEF DESCRIPTION OF THE DRAWINGS

The drawings described herein are provided merely for the purpose of illustrating the selected embodiments rather than all possible embodiments, and are not intended to limit the scope of the present disclosure. In the drawings.

Figure 1:
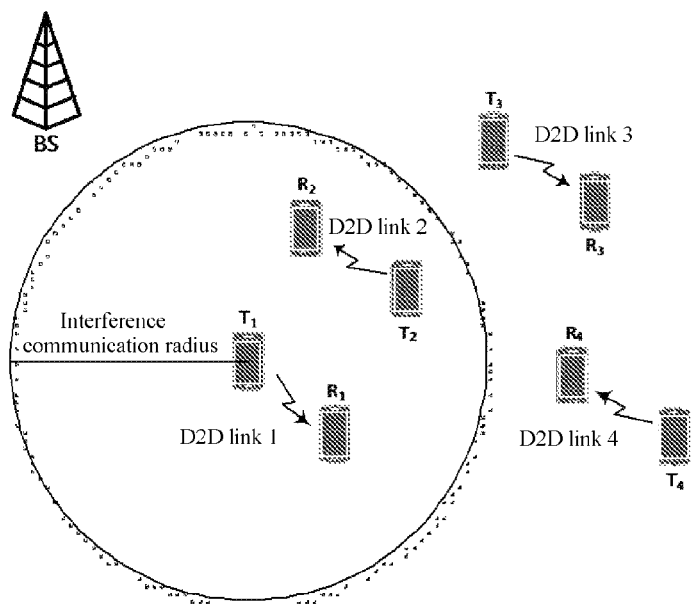
FIG. 1 is a schematic diagram showing a wireless communication system according to an embodiment of the present disclosure.

While specific embodiments of the present disclosure are shown as examples in the drawings and are described here in detail, various modifications and variations may be made to the present disclosure. It should be understood that the description for the specific embodiments herein is not intended to limit the present disclosure to the disclosed specific forms, and the present disclosure is intended to encompass all modifications, equivalents and alternatives that fall within the spirit and scope of the present disclosure. It should be noted that reference numerals indicate parts corresponding to the reference numerals throughout the drawings.

DETAILED DESCRIPTION OF EMBODIMENTS

Examples of the present disclosure are described more fully with reference to the drawings. The following description is merely exemplary rather than being intended to limit the present disclosure and applications or purposes of the present disclosure.

Exemplary embodiments are provided to make the present disclosure be exhaustive and fully convey the scope of the present disclosure to those skilled in the art. Various specific details such as specific parts, devices and methods are set forth to provide thorough understanding for the embodiments of the present disclosure. It is apparent to those skilled in the art that the exemplary embodiments may be embodied in many different forms without the specific details, and the specific details are not interpreted as a limit for the scope of the present disclosure. In some exemplary embodiments, well-known processes, well-known structures and well-known technology are not described in detail.

A user equipment (UE) in the present disclosure includes but is not limited to a terminal having a wireless communication function such as a mobile terminal, a computer or an in-vehicle apparatus. Further, depending on a function described, the UE in the present disclosure may also be the UE itself or a component such as a chip in the UE. Similarly, a base station in the present disclosure may be, for example, an eNB or a component such as a chip in the eNB. Furthermore, technical solutions in the present disclosure may be applied to, for example, a frequency division duplexing (FDD) system and a time division duplexing (TDD) system.

FIG. 1 is a schematic diagram showing a wireless communication system according to an embodiment of the present disclosure. As shown in FIG. 1, a base station BS is located in the wireless communication system, and a plurality of user equipments including $R_1$, $R_2$, $R_3$, $R_4$, $T_1$, $T_2$, $T_3$ and $T_4$, are in a coverage range of the base station. The plurality of user equipments form a plurality of D2D links. A transmitting end of a D2D link 1 is $T_1$, and a receiving end of the D2D link 1 is $R_1$. A transmitting end of a D2D link 2 is $T_2$, and a receiving end of the D2D link 2 is $R_2$. A transmitting end of a D2D link 3 is $T_3$, and a receiving end of the D2D link 3 is $R_3$. A transmitting end of a D2D link 4 is $T_4$, and a receiving end of the D2D link 4 is $R_4$. It should be understood by those skilled in the art that, although FIG. 1 shows only a case that the wireless communication system includes one base station, the wireless communication system may include a plurality of base stations, and a plurality of D2D links may be in a coverage range of each of the plurality of base stations. As shown in FIG. 1, an interference region of the D2D link 1 is approximately a circle, and a radius of the circle is an interference communication radius of the D2D link 1. The D2D link 1 may be interfered by other D2D links such as the D2D link 2 in the interference region of the D2D link 1, so that the user equipments at the transmitting end and the receiving end of the D2D link 1 cannot normally communicate with each other. However, the D2D link 1 is not interfered by the D2D link 3 and the D2D link 4 which are far away from the D2D link 1. Therefore, in the present disclosure, a neighbor D2D link of a D2D link is defined as a set of D2D links that cannot transmit information simultaneously with the D2D link due to the interference. An object of the present disclosure is to provide a user equipment and a base station in a wireless communication system and a wireless communication method, so that the base station can determine a neighbor D2D link of each D2D link in a coverage range of the base station. Next, the base station may reasonably configure resources based on the information on the neighbor D2D links of all the D2D links, including but not limited to avoiding that a D2D link transmits information simultaneously with a neighbor D2D link of the D2D link and allowing that the D2D link transmits information simultaneously with other D2D links than the neighbor D2D link of the D2D link, thereby improving the effectiveness of the D2D communication and the system capacity.

In the present disclosure, a D2D link includes a transmitting end user equipment and a receiving end user equipment. A neighbor D2D link of the D2D link is also referred to as a neighbor D2D link of the transmitting end user equipment of the D2D link and a neighbor D2D link of the receiving end user equipment of the D2D link, which are not distinguished from each other in the present disclosure. That is, in a case that the base station acquires a neighbor D2D link of a transmitting end user equipment of a D2D link, the acquired neighbor D2D link may be used as a neighbor D2D link of the D2D link. Similarly, in a case that the base station acquires a neighbor D2D link of a receiving end user equipment of a D2D link, the acquired neighbor D2D link may be used as a neighbor D2D link of the D2D link.

Next, a user equipment, a base station and a wireless communication method according to the present disclosure are described with reference to the drawings.

Figure 2:
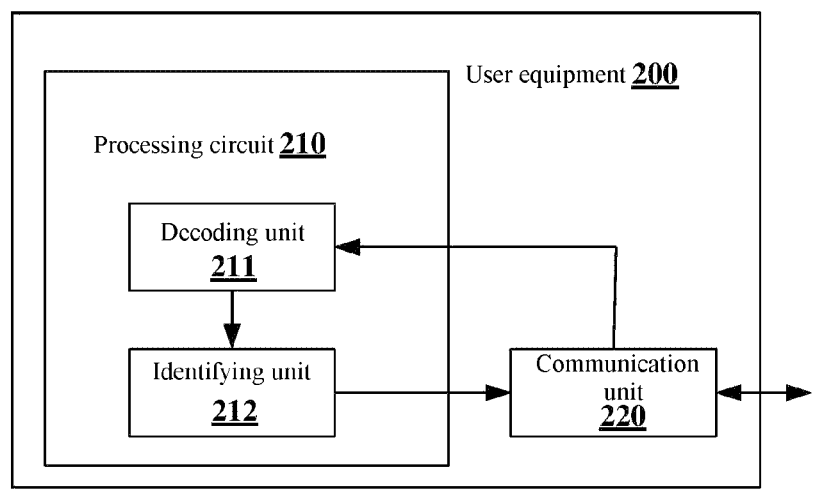
FIG. 2 is a block diagram showing a structure of a user equipment for performing D2D communication in a wireless communication system according to an embodiment of the present disclosure.

FIG. 2 is a block diagram showing a structure of a user equipment for performing D2D communication in a wireless communication system according to an embodiment of the present disclosure.

According to the embodiment of the present disclosure, the wireless communication system may include a plurality of D2D links. A user equipment 200 may serve as a receiving end user equipment of a D2D link in the wireless communication system.

As shown in FIG. 2, the user equipment 200 may include a processing circuit 210. It should be noted that the user equipment 200 may include one processing circuit 210 or a plurality of processing circuits 210. The user equipment 200 may further include a communication unit 220 such as a transceiver.

Further, the processing circuit 210 may include various discrete functional units to perform various different functions and/or operations. It should be noted that the functional units may be physical entities or logical entities, and units referred to as different names may be implemented as a same physical entity.

For example, as shown in FIG. 2, the processing circuit 210 may include a decoding unit 211 and an identifying unit 212.

According to the embodiment of the present disclosure, the decoding unit 211 may cause the communication unit 220 to receive a beacon signal transmitted by a transmitting end user equipment performing D2D communication in the wireless communication system, and the decoding unit 211 may decode the received beacon signal. In this embodiment, the beacon signal may be decoded by using any well-known method in the art, which is not limited in the present disclosure. According to the embodiment of the present disclosure, the beacon signal may include identification information for identifying a D2D link where the transmitting end user equipment is located, for example, including but not limited to number information of the D2D link. Further, the decoding unit 211 may transmit the decoding result to the identifying unit 212.

According to the embodiment of the present disclosure, the identifying unit 212 may identify the D2D link where the transmitting end user equipment is located as a neighbor D2D link of the receiving end user equipment, based on the identification information in the beacon signal that is decoded correctly. In this embodiment, the identifying unit 212 may acquire the decoding result from the decoding unit 211. The decoding result includes the identification information of the D2D link. Thus, the identifying unit 212 may acquire identification information carried in all the beacon signals that are decoded correctly, and a set of D2D links identified by the identification information of the D2D links may serve as a neighbor D2D link of the user equipment 200. Further, the identifying unit 212 may also cause the communication unit 220 to transmit the identified neighbor D2D link to a base station in the wireless communication system.

According to the embodiment of the present disclosure, the beacon signal acquired by the user equipment 200 may be a beacon signal transmitted by a transmitting end user equipment of a D2D link in the wireless communication system. In a case that the decoding unit 211 of the user equipment 200 can receive the beacon signal transmitted by the transmitting end user equipment, it is indicated that the transmitting end user equipment for transmitting the beacon signal of the D2D link is located close to the user equipment 200 and is located in an interference communication radius of the D2D link where the user equipment 200 is located. That is, a D2D link where the transmitting end user equipment for transmitting the beacon signal of the D2D link is located is a neighbor D2D link of the D2D link where the user equipment 200 is located. Therefore, the identifying unit 212 of the user equipment 200 may acquire information on the neighbor D2D link by identifying the identification information of the D2D link carried in the beacon signal. According to the embodiment of the present disclosure, the number of beacon signals that can be received and correctly decoded by the user equipment 200 may be more than one. Therefore, the user equipment 200 may acquire information on a plurality of neighbor D2D links. A set of the plurality of neighbor D2D links may serve as a final neighbor D2D link.

Taking FIG. 1 as an example, how the user equipment 200 identifies a neighbor D2D link and reports the identified neighbor D2D link to the base station according to the embodiment of the present disclosure is described below in detail. The user equipment 200 according to the embodiment of the present disclosure may be, for example, the user equipment $R_1$ shown in FIG. 1. Each of the transmitting end user equipments $T_1$, $T_2$, $T_3$ and $T_4$ of the D2D links shown in FIG. 1 may transmit a beacon signal. It is assumed that, a beacon signal transmitted by the $T_1$ carries a D2D link number 1, a beacon signal transmitted by the $T_2$ carries a D2D link number 2, a beacon signal transmitted by the $T_3$ carries a D2D link number 3, and a beacon signal transmitted by the $T_4$ carries a D2D link number 4. According to the embodiment of the present disclosure, since the D2D link 2 is located in the interference communication radius of the D2D link 1, the user equipment $R_1$ can receive the beacon signals transmitted by the user equipments $T_1$ and $T_2$. Further, the decoding unit 211 may decode the received beacon signals. For ease of illustration, it is assumed that the two beacon signals can be correctly decoded by the decoding unit 211, without considering other factors. Thus the identifying unit 212 may identify based on the D2D link number 2 carried in the beacon signal transmitted by the user equipment $T_2$ that, the D2D link 2 is a neighbor D2D link of the user equipment $R_1$. In addition, since the D2D link 3 and the D2D link 4 are located outside the interference communication radius of the D2D link 1, the user equipment $R_1$ cannot receive the beacon signals transmitted by the user equipments $T_3$ and $T_4$. The processes of identifying other neighbor D2D links of the user equipment $R_1$ are similar to the process of identifying the D2D link 2, which are not described in detail herein.

According to the embodiment of the present disclosure, the user equipment 200 receives a beacon signal transmitted by a transmitting end user equipment of a D2D link and decodes the received beacon signal, and the user equipment identifies a neighbor D2D link of the user equipment 200 based on the beacon signal that is decoded correctly. Therefore, the base station can acquire the neighbor D2D link of the user equipment 200 without acquiring a geographic location of the user equipment, thereby more reasonably configuring resources based on the neighbor D2D links of the user equipments, and thus improving the effectiveness of the D2D communication and the system capacity.

According to the embodiment of the present disclosure, the processing circuit 210 (e.g., a monitoring unit, which is not shown) may monitor each resource block in a resource pool of the wireless communication system. The resource block is used to transmit the beacon signal.

According to the embodiment of the present disclosure, the resource pool of the wireless communication system may include a plurality of physical resource blocks (PRBs). A size of the resource pool may be determined by a high layer of the wireless communication system according to actual requirements.

Figure 3:
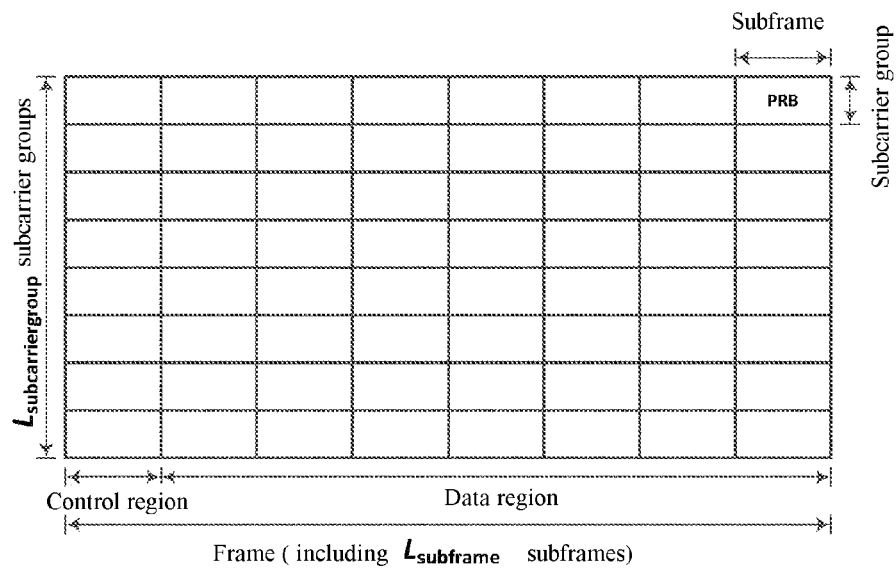
FIG. 3 is a schematic diagram showing a resource pool according to an embodiment of the present disclosure.

FIG. 3 is a schematic diagram showing a resource pool according to an embodiment of the present disclosure. As shown in FIG. 3, a horizontal direction corresponds to a time axis, which is formed by consecutive frames. Each of the frames includes $L_{subframes}$ consecutive subframes and is divided into a control region and a data region. Further, a vertical direction corresponds to a frequency axis. It is assumed that the upper link spectrum with $L_{subcarriergroup}$ subcarrier groups is allowed to be used for the D2D communication in the wireless communication system, a PRB represents a subcarrier group in the frequency domain and a subframe in the time domain, as shown in FIG. 3. It should be noted that, although FIG. 3 shows only a case that the time axis has one frame, the time axis of the resource pool of the wireless communication system may also has a plurality of frames according to actual requirements.

According to the embodiment of the present disclosure, the user equipment 200 may monitor each resource block in a resource pool of a wireless communication system. Each resource block in the resource pool may be used by another user equipment to transmit a beacon signal.

According to the embodiment of the present disclosure, the processing circuit 210 is further configured to: acquire the beacon signal that is not decoded correctly, and identify the resource block for transmitting the beacon signal that is not decoded correctly as a resource block in which a conflict occurs; and cause the communication unit 220 to transmit a feedback signal via the resource block in which a conflict occurs. The feedback signal includes identification information for identifying a D2D link where the receiving end user equipment 200 is located.

As described above, the size of the resource pool of the wireless communication system may be determined by a high layer according to actual requirements. The wireless communication system may include a plurality of D2D links, i.e., including transmitting end user equipments of the a plurality of D2D links. In a case that the number of the transmitting end user equipments is great while the number of resource blocks in the resource pool is small, two or more transmitting end user equipments may transmit beacon signals via the same resource block, and the two or more transmitting end user equipments are both located in an interference region of a certain receiving end user equipment. In this case, the user equipment 200 as the receiving end user equipment can receive the beacon signals transmitted via the same resource block, while the decoding unit 211 cannot correctly decode the beacon signals. Therefore, according to the embodiment of the present disclosure, the decoding unit 211 may also transmit the beacon signals that are not decoded correctly to the identifying unit 212. Further, the identifying unit 212 may identify a resource block in which a conflict occurs, based on the beacon signals that are not decoded correctly. In this embodiment, the identifying unit 212 identifies the resource block for transmitting the beacon signals that are not decoded correctly as the resource block in which a conflict occurs. Further, the identifying unit 212 may cause the communication unit 220 to transmit a feedback signal via the resource block in which a conflict occurs. The feedback signal includes identification information for identifying the D2D link where the user equipment 200 is located.

For example, in a case that the D2D link 3 shown in FIG. 1 is also located in the interference region of the D2D link 1 and both the D2D link 2 and the D2D link 3 transmit beacon signals via a resource block 2, the user equipment $R_1$ as the receiving end user equipment of the D2D link 1 can receive the beacon signals transmitted via the resource block 2, while the decoding unit 211 cannot correctly decode the beacon signals. That is, although both the D2D link 2 and the D2D link 3 are neighbor D2D links of the user equipment $R_1$, the user equipment $R_1$ cannot acquire link identification information of the two D2D links. According to the embodiment of the present disclosure, in this case, the decoding unit 211 of the user equipment $R_1$ may transmit the beacon signals that are not decoded correctly to the identifying unit 212, and the identifying unit 212 identifies the resource block 2 in which a conflict occurs and causes the communication unit 220 to transmit a feedback signal via the resource block 2. The feedback signal includes identification information for identifying the D2D link 1, including but not limited to the number information of the D2D link 1.

According to the embodiment of the present disclosure, on one hand, the feedback signal transmitted by the user equipment 200 may also be regarded as a beacon signal, and the transmitting end user equipment of the D2D link in the wireless communication system may monitor the feedback signal by using a similar manner as the above manner, thus the transmitting end user equipment can also identify a neighbor D2D link of the transmitting end user equipment. On the other hand, by monitoring the feedback signal, the transmitting end user equipment may determine that a conflict occurs between the resource block used when the transmitting end user equipment transmits the beacon signal and other transmitting end user equipments. Thus the transmitting end user equipment may perform subsequent processing, such as retransmitting a beacon signal.

According to the embodiment of the present disclosure, the identifying unit 212 of the user equipment 200 may identify one or more resource blocks in which a conflict occurs. The processing circuit 210 may cause the communication unit 220 to transmit a feedback signal via each of the one or more resource blocks in which a conflict occurs.

According to the embodiment of the present disclosure, the processing circuit 210 is further configured to: select a frame randomly; and cause the communication unit 220 to transmit the feedback signal via the resource block in which a conflict occurs in the randomly selected frame.

In this embodiment, by randomly selecting a frame, different receiving end user equipments may transmit the feedback signals via different frames as far as possible. That is, the resource blocks are distinguished from each other in terms of time to avoid that the conflict occurs between the transmitted feedback signals again, which may be achieved by generating a random integer. For example, the processing circuit 210 is further configured to generate a random integer $m_q$, and select an $m_q$-th frame after a time when the random integer $m_q$ is generated as a randomly selected frame.

According to the embodiment of the present disclosure, the processing circuit 210 may also set a maximum value for the generated random integer $m_q$. For example, the processing circuit 210 is further configured to: generate a random integer $m_q$, where $1 \le m_q \le M$, and M is an integer greater than 0; and cause the communication unit 220 to transmit a feedback signal via the resource block in which a conflict occurs in an $m_q$-th frame after a time when the random integer $m_q$ is generated.

In this embodiment, the identifying unit 212 of each receiving end user equipment 200 transmitting the feedback signal may generate a random integer $m_q$, and may cause the communication unit 220 to transmit the feedback signal via the resource block in which a conflict occurs in the $m_q$-th frame after a time when the random integer $m_q$ is generated. In this way, random integers generated by other user equipments as the receiving end of the D2D link may be different from the random integer generated by the user equipment 200, and other user equipments and the user equipment 200 are likely to transmit respective feedback signals in different frames.

In this embodiment, the M may be set as a great value so that different receiving end user equipments may transmit the feedback signals via different frames as far as possible, to avoid that the conflict occurs again. With respect to the transmitting end user equipment, since a possibility that no conflict occurs between the received feedback signals is great, the transmitting end user equipment may decode the feedback signals correctly, and the transmitting end user equipment may identify a neighbor D2D link of the transmitting end user equipment based on the feedback signals decoded correctly, which is similar to the process that the receiving end user equipment identifies a neighbor D2D link of the receiving end user equipment. This part is described below in detail in the subsequent description.

According to the embodiment of the present disclosure, the conflict between the feedback signals may not be required to be avoided, and the transmitting end user equipment is required to know only the conflict between the resource block used when the transmitting end user equipment transmits the beacon signal and other transmitting end user equipments.

In this case, the value of the M may be 1 or 2. In this case, even if different receiving end user equipments transmit feedback signals to the same transmitting end user equipment via the same resource block and the transmitting end user equipment cannot decode the feedback signals correctly, the transmitting end user equipment has already known that a conflict occurs between the resource block used when the transmitting end user equipment transmits the beacon signal and other transmitting end user equipments. Thus the transmitting end user equipment may perform subsequent processing, such as retransmitting a beacon signal. This part is described below in detail in the subsequent description of the present disclosure.

According to the embodiment of the present disclosure, the wireless communication system may include a plurality of base stations and a plurality of D2D links. Each of the plurality of D2D links includes a transmitting end user equipment and a receiving end user equipment.

According to the embodiment of the present disclosure, the user equipment 200 may be in a dense scenario. For example, the user equipment 200 may be in the dense non-public security scenario described above. In the dense scenario, the number of the D2D links in the wireless communication system exceeds a preset threshold.

According to the embodiment of the present disclosure, the processing circuit 210 periodically performs the above operations, including operations that the decoding unit 211 receives a beacon signal transmitted via a resource block and decodes the beacon signal, and the identifying unit 212 identifies a neighbor D2D link of the user equipment 200 based on the beacon signal that is decoded correctly and causes the communication unit 220 to transmit the identified neighbor D2D link to a base station, and the like. In this way, it can be ensured that the user equipment 200 can identify a latest neighbor D2D link.

According to the embodiment of the present disclosure, the processing circuit 210 includes a timer. Each time when the timer expires, the processing circuit 210 is triggered to perform the above operations.

As described above, the user equipment 200 as a receiving end user equipment of a D2D link in the wireless communication system has been described in detail with reference to the drawings. A user equipment 400 as a transmitting end user equipment of a D2D link in the wireless communication system is described below in detail with reference to FIG. 4.

Figure 4:
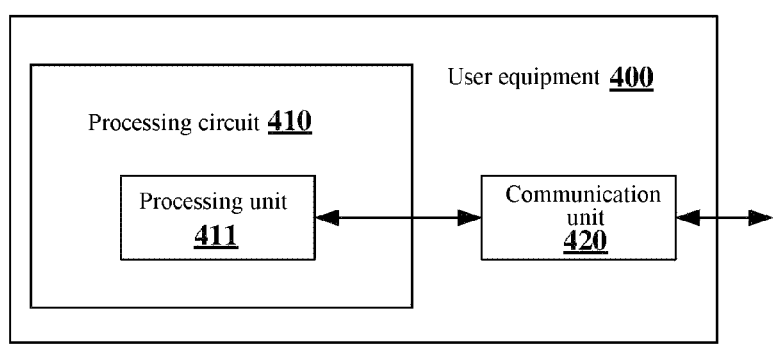
FIG. 4 is a block diagram showing a structure of another user equipment for performing D2D communication in a wireless communication system according to an embodiment of the present disclosure.

FIG. 4 is a block diagram showing a structure of another user equipment for performing D2D communication in a wireless communication system according to an embodiment of the present disclosure.

According to the embodiment of the present disclosure, the wireless communication system includes a plurality of D2D links. The user equipment 400 may serve as a transmitting end user equipment of a D2D link.

As shown in FIG. 4, the user equipment 400 may include a processing circuit 410. It should be noted that the user equipment 400 may include one processing circuit 410 or a plurality of processing circuits 410. The user equipment 400 may further include a communication unit 420 such as a transceiver.

As described above, similarly, the processing circuit 410 may include various discrete functional units to perform various different functions and/or operations. The functional units may be physical entities or logical entities, and units referred to as different names may be implemented as a same physical entity.

For example, as shown in FIG. 4, the processing circuit 410 may include a processing unit 411.

According to the embodiment of the present disclosure, the processing unit 411 may cause the communication unit 420 to transmit a beacon signal to a receiving end user equipment performing the D2D communication in the wireless communication system. The beacon signal includes identification information for identifying a D2D link where the transmitting end user equipment 400 is located.

In this embodiment, the processing unit 411 may generate a beacon signal. Further, the processing unit 411 may cause the communication unit 420 to transmit the beacon signal.

According to the embodiment shown in FIG. 1, the user equipments $T_1$, $T_2$, $T_3$ and $T_4$ may transmit beacon signals. For example, a beacon signal transmitted by the user equipment $T_1$ includes information for identifying the D2D link 1, a beacon signal transmitted by the user equipment $T_2$ includes information for identifying the D2D link 2, a beacon signal transmitted by the user equipment $T_3$ includes information for identifying the D2D link 3, and a beacon signal transmitted by the user equipment $T_4$ includes information for identifying the D2D link 4.

According to the embodiment of the present disclosure, after the communication unit 420 of the user equipment 400 transmits the beacon signal, the communication unit 220 of the user equipment 200 described above may receive the beacon signal, and the decoding unit 211 may decode the beacon signal, and the identifying unit 212 may identify the neighbor D2D link of the user equipment 200 based on the beacon signal that is decoded correctly. This part has been described above in detail, which is not repeated herein.

According to the embodiment of the present disclosure, the processing circuit 410 (e.g., a selection unit, which is not shown) may randomly select a resource block from a resource pool of the wireless communication system. For example, the processing circuit 410 may randomly select a resource block from a resource pool such as the resource pool shown in FIG. 3. Further, the selected resource block may be transmitted to the processing unit 411 so that the processing unit 411 causes the communication unit 420 to transmit the beacon signal via the selected resource block.

According to the embodiment of the present disclosure, the processing circuit 410 is further configured to, before a resource block is randomly selected from a resource pool of the wireless communication system: generate a random number; compare the generated random number with a preset threshold; and transmit a beacon signal in a case that the generated random number is greater than the preset threshold.

According to the embodiment of the present disclosure, the wireless communication system may include a plurality of D2D links, i.e., including transmitting end user equipments of the plurality of D2D links. In a case that the number of the transmitting end user equipments of the D2D links is greater than a certain number, transmitting end user equipments of some D2D links among the D2D links may be selected to transmit beacon signals. According to the embodiment of the present disclosure, this may be achieved by generating a random number. For example, before the user equipment 400 randomly selects a resource block, the user equipment 400 (e.g., a determining unit, which is not shown) may generate a random number and compare the generated random number with a preset threshold. In a case that the random number is greater than the preset threshold, a resource block is randomly selected and a beacon signal is transmitted via the selected resource block. In a case that the random number is less than or equal to the preset threshold, no resource block is selected and no beacon signal is transmitted. In this case, before a resource block is randomly selected next time, a random number is generated again to determine whether to transmit a beacon signal next time. Practically, according to the embodiments of the present disclosure, the transmitting end user equipments of some D2D links among the D2D links may transmit beacon signals by using other methods such as a method in which the D2D links are grouped, which is not limited in the present disclosure.

As mentioned above, the identifying unit 212 of the user equipment 200 may identify a resource block in which a conflict occurs based on the beacon signal that is not decoded correctly, and the communication unit 220 may transmit a feedback signal via the resource block in which a conflict occurs. The feedback signal includes identification information of a D2D link where the user equipment 200 is located. Thus, according to the embodiment of the present disclosure, the processing circuit 410 (e.g., a monitoring unit, which is not shown) may monitor a randomly selected resource block. Further, the communication unit 420 may receive a feedback signal transmitted via the randomly selected resource block by the receiving end user equipment 200 performing the D2D communication in the wireless communication system. Further, the processing circuit 410 (e.g., a decoding unit, which is not shown) may decode the received feedback signal. The feedback signal includes identification information for identifying the D2D link where the receiving end user equipment 200 is located. Further, the processing circuit 410 (for example, an identifying unit, which is not shown) may identify the D2D link where the receiving end user equipment 200 is located as a neighbor D2D link of the transmitting end user equipment 400, based on the identification information in the feedback signal that is decoded correctly. Further, the communication unit 420 may transmit the identified neighbor D2D link to a base station in the wireless communication system.

According to the embodiment of the present disclosure, after the communication unit 420 transmits the beacon signal via the selected resource block, the processing circuit 410 (e.g., a monitoring unit, which is not shown) of the user equipment 400 may monitor the randomly selected resource block to determine whether a feedback signal is transmitted via the resource block.

According to the embodiment of the present disclosure, in a case that the user equipment 400 monitors a feedback signal transmitted via the resource block, the processing circuit 410 (e.g., a decoding unit, which is not shown) of the user equipment 400 may acquire the feedback signal transmitted via the resource block and may decode the feedback signal. In this embodiment, the processing circuit 410 of the user equipment 400 may decode the feedback signal by using any well-known method in the art, which is not limited in the present disclosure.

According to the embodiment of the present disclosure, the processing circuit 410 (e.g., an identifying unit, which is not shown) of the user equipment 400 may identify the D2D link where the receiving end user equipment 200 is located as a neighbor D2D link of the transmitting end user equipment 400, based on the identification information in the feedback signal that is decoded correctly. According to the embodiment of the present disclosure, in a case that the processing circuit 410 of the user equipment 400 can monitor the feedback signal transmitted via the selected resource block, it is indicated that the receiving end user equipment for transmitting the feedback signal of the D2D link is located close to the user equipment 400 and is located in an interference communication radius of the D2D link where the user equipment 400 is located. That is, a D2D link where the receiving end user equipment for transmitting the feedback signal of the D2D link is located is a neighbor D2D link of the D2D link where the user equipment 400 is located. Therefore, the processing circuit 410 of the user equipment 400 may acquire information on the neighbor D2D link by identifying the identification information of the D2D link carried in the feedback signal. According to the embodiment of the present disclosure, the number of feedback signals that can be acquired and correctly decoded by the user equipment 400 may be more than one. Therefore, the user equipment 400 may acquire information on a plurality of neighbor D2D links. A set of the plurality of neighbor D2D links may serve as a final neighbor D2D link. The user equipment 400 may report the final neighbor D2D link to the base station.

As mentioned above, in the case that the D2D link 3 shown in FIG. 1 is also located in the interference region of the D2D link 1 and both the D2D link 2 and the D2D link 3 transmit the beacon signals via the resource block 2, the user equipment $R_1$ as the receiving end user equipment of the D2D link 1 cannot correctly decode the beacon signals. In this case, the user equipment $R_1$ transmits a feedback signal via the resource block 2. The feedback signal includes identification information for identifying the D2D link 1. According to the embodiment of the present disclosure, both the user equipments $T_2$ and $T_3$ may monitor the resource block 2 after transmitting the beacon signals. In a case that the user equipments $T_2$ and $T_3$ monitor the feedback signal transmitted via the resource block 2, the user equipments $T_2$ and $T_3$ may acquire the feedback signal and may decode the feedback signal. For example, if the user equipment $T_2$ correctly decodes the feedback signal, the user equipment $T_2$ may determine that the D2D link 1 is a neighbor D2D link of the user equipment $T_2$, based on the identification information of the D2D link 1 carried in the feedback signal.

According to the embodiment of the present disclosure, not only the receiving end user equipment of the D2D link may report information on a neighbor D2D link of the receiving end user equipment, but also the transmitting end user equipment of the D2D link may report information on a neighbor D2D link of the transmitting end user equipment. When the base station receives the information on the neighbor D2D links reported by the receiving end user equipment and the transmitting end user equipment of the D2D link, the base station may process the information on the neighbor D2D links to finally determine a neighbor D2D link of each D2D link. Therefore, the base station can more accurately acquire the neighbor D2D link of each D2D link without acquiring the geographic location information of the user equipment, thereby more reasonably configuring resources.

As mentioned above, in the case that a plurality of user equipments need to transmit feedback signals, a conflict also occurs in a resource block via which the feedback signals are transmitted. If different receiving end user equipments of the D2D link transmit feedback signals to the same transmitting end user equipment of the D2D link via the same resource block, the transmitting end user equipment cannot correctly decode the feedback signals.

According to the embodiment of the present disclosure, in a case that there is a feedback signal which is not decoded correctly, the processing circuit 410 causes the communication unit 420 to repeatedly transmit the beacon signal to the receiving end user equipment performing the D2D communication in the wireless communication system.

According to the embodiment of the present disclosure, in a case that the feedback signal is not correctly decoded by the processing circuit 410, the processing unit 411 of the processing circuit 410 causes the communication unit 420 to transmit the beacon signal again. In this way, only the transmitting end user equipment that does not correctly decode the feedback signal transmits the beacon signal again. Since the number of the transmitting end user equipments that transmit the beacon signals again is generally much less than the number of transmitting end user equipments that transmit the beacon signals last time, a possibility that a conflict occurs between the beacon signals again is reduced.

According to the embodiment of the present disclosure, the process that the user equipment 400 randomly selects a resource block and transmits a beacon signal via the selected resource block may be regarded as an "announcement process". In addition, the process that the user equipment 200 receives and decodes the beacon signal, identifies a neighbor D2D link of the user equipment 200 based on the beacon signal that is decoded correctly, and transmits a feedback signal via a resource block in which a conflict occurs may be regarded as a "conflict resolution process".

According to the embodiment of the present disclosure, after the user equipment 400 performs the "announcement process" once, the user equipment 200 may perform the "conflict resolution process" once in a case that the user equipment 200 determines that a conflict occurs in a resource block. After the user equipment 200 performs the "conflict resolution process" once, the user equipment 400 may perform the "announcement process" once again in a case that the user equipment 400 determines that a conflict occurs in a resource block. The above process is repeated until the user equipment 200 determines that no conflict occurs in the resource block after the user equipment 400 performs the "announcement process" once, or the user equipment 400 determines that no conflict occurs in the resource block after the user equipment 200 performs the "conflict resolution process" once. For example, the user equipment 400 may perform the "announcement process" once by using one frame, and the user equipment 200 may perform the "conflict resolution process" once by using M frames.

According to the embodiment of the present disclosure, each time when the user equipment 400 performs the "announcement process", the user equipment 200 reports the neighbor D2D link of the user equipment 200 to the base station. In addition, each time when the user equipment 200 performs the "conflict resolution process", the user equipment 400 reports the neighbor D2D link of the user equipment 400 to the base station. At the base station side, after the base station receives the neighbor D2D links transmitted by the user equipment 200 and the user equipment 400, the base station may collate the neighbor D2D links to acquire a final neighbor D2D link.

According to the embodiment of the present disclosure, a time period may also be set. When the time period expires, both the user equipment 400 and the user equipment 200 stop performing the respective processes. The base station determines the final neighbor D2D link based on the currently reported neighbor D2D link.

According to the embodiment of the present disclosure, the wireless communication system may include a plurality of base stations and a plurality of D2D links. Each of the plurality of D2D links includes a transmitting end user equipment and a receiving end user equipment.

According to the embodiment of the present disclosure, the user equipment 400 may be in a dense scenario. For example, the user equipment 400 may be in the dense non-public security scenario described above. In the dense scenario, the number of the D2D links in the wireless communication system exceeds a preset threshold.

According to the embodiment of the present disclosure, the processing circuit 410 periodically performs the above operations, including causing the communication unit 420 to transmit a beacon signal, or the like. In this way, it can be ensured that the user equipment 400 can identify a latest neighbor D2D link.

According to the embodiment of the present disclosure, the processing circuit 410 includes a timer. Each time when the timer expires, the processing circuit 410 is triggered to perform the above operations.

According to the embodiment of the present disclosure, the processing circuit 410 may be further configured to, before a resource block is randomly selected from a resource pool of the wireless communication system: determine whether a flag variable is ON, and randomly select a resource block from the resource pool of the wireless communication system in a case that the flag variable is ON. The flag variable is initialized to be ON each time when the timer expires.

According to the embodiment of the present disclosure, before a random number is generated, the processing circuit 410 may be further configured to: determine whether the flag variable is ON. The random number is generated in a case that the flag variable is ON. The flag variable is initialized to be ON each time when the timer expires.

According to the embodiment of the present disclosure, in a case that there is no feedback signal which is not decoded correctly, the processing circuit 410 flags the flag variable as OFF. In this way, it can be ensured that only the user equipment 400 that does not correctly decode the feedback signal retransmits a beacon signal.

As described above, the user equipment 200 as a receiving end user equipment of a D2D link and the user equipment 400 as a transmitting end user equipment of a D2D link in the wireless communication system have been described in detail with reference to the drawings. A base station 500 in the wireless communication system is described below in detail with reference to FIG. 5.

Figure 5:
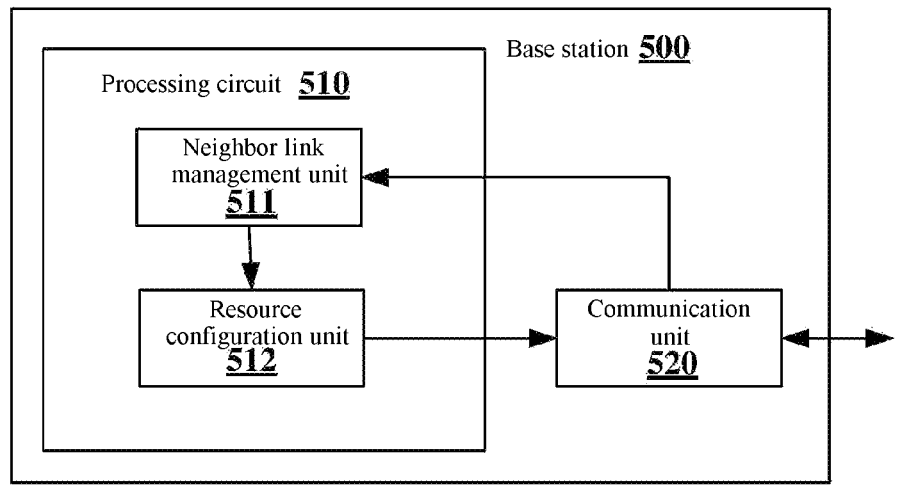
FIG. 5 is a block diagram showing a structure of a base station for performing D2D communication in a wireless communication system according to an embodiment of the present disclosure.

FIG. 5 is a block diagram showing a structure of a base station for performing D2D communication in a wireless communication system according to an embodiment of the present disclosure.

As shown in FIG. 5, the base station 500 may include a processing circuit 510. It should be noted that the base station 500 may include one processing circuit 510 or a plurality of processing circuits 510. The base station 500 may further include a communication unit 520 such as a transceiver.

As described above, similarly, the processing circuit 510 may include various discrete functional units to perform various different functions and/or operations. The functional units may be physical entities or logical entities, and units referred to as different names may be implemented as a same physical entity.

For example, as shown in FIG. 5, the processing circuit 510 may include a neighbor link management unit 511 and a resource configuration unit 512.

According to the embodiment of the present disclosure, the neighbor link management unit 511 may cause the communication unit 520 to receive a neighbor D2D link of each receiving end user equipment identified by the receiving end user equipment of each of the plurality of D2D links, and determine a neighbor D2D link of each of the plurality of D2D links based on the received neighbor D2D link of each receiving end user equipment. In this embodiment, the wireless communication system may include a plurality of D2D links, i.e., including receiving end user equipments and transmitting end user equipments of the plurality of D2D links. Each of the receiving end user equipments may be, for example, the user equipment 200 shown in FIG. 2. Each of the transmitting end user equipments may be, for example, the user equipment 400 shown in FIG. 4. The neighbor link management unit 511 can cause the communication unit 520 to receive a neighbor D2D link of the receiving end user equipment 200 identified by the user equipment 200 of the D2D link, and the received neighbor D2D link may be used as a neighbor D2D link of the D2D link where the user equipment 200 is located. This part has been described in detail in the above description with respect to the user equipment 200, which is not repeated herein.

Further, after the communication unit 520 receives the neighbor D2D link transmitted by each receiving end user equipment, the received neighbor D2D links may be collated to acquire a neighbor D2D link of each D2D link. For example, the neighbor link management unit 511 of the base station 500 may take a union of neighbor D2D links transmitted for one time or a plurality of times by a receiving end user equipment as a neighbor D2D link of the D2D link where the receiving end user equipment is located. Further, the base station 500 may store the neighbor D2D link of each D2D link in the neighbor link management unit 511, and the neighbor link management unit 511 may update the stored neighbor D2D link. Further, the neighbor link management unit 511 may transmit a latest D2D link of each D2D link to the resource configuration unit 512.

The resource configuration unit 512 may configure, based on the neighbor D2D link of each D2D link, resources for the receiving end user equipment and the transmitting end user equipment of each of the D2D links, for the D2D communication. In this embodiment, the resource configuration unit 512 may acquire the neighbor D2D link of each D2D link from the neighbor link management unit 511. According to the embodiment of the present disclosure, the resource configuration unit 512 may configure resources for the receiving end user equipment and the transmitting end user equipment of each of the D2D links based on the neighbor D2D link of each D2D link. Further, each D2D link may also report information such as a transmission request and a queue length to the base station, and the base station may also configure resources for the receiving end user equipment and the transmitting end user equipment of each of the D2D links based on the information such as the transmission request and the queue length.

According to the embodiment of the present disclosure, the base station may configure resources by using any well-known resource configuration or scheduling algorithm in the art, which is not limited in the present disclosure. For example, the base station may configure resources so that a D2D link does not transmit information simultaneously with a neighbor D2D link of the D2D link, and/or so that a D2D link is allowed to transmit information simultaneously with other D2D links than a neighbor D2D link of the D2D link. Further, the base station may also transmit the resource configuration information to each D2D link, so that the D2D link performs the D2D communication by using the configured resources.

According to the embodiment of the present disclosure, the processing circuit 510 is further configured to: cause the communication unit 520 to receive a neighbor D2D link of each transmitting end user equipment identified by the transmitting end user equipment of each of the plurality of D2D links; determine a neighbor D2D link of each of the plurality of D2D links based on the received neighbor D2D link of each receiving end user equipment and the received neighbor D2D link of each transmitting end user equipment; and configure, based on the neighbor D2D link of each of the plurality of D2D links, resources for the receiving end user equipment and the transmitting end user equipment of each of the plurality of D2D links, for the D2D communication.

As mentioned above, the user equipment 400 as the transmitting end user equipment of the D2D link may also report the neighbor D2D link of the user equipment 400 to the base station. In other words, all the receiving end user equipments 200 in the wireless communication system report neighbor D2D links to the base station, and all the transmitting end user equipments 400 also report neighbor D2D links to the base station. Each receiving end user equipment 200 may report a neighbor D2D link to the base station for a plurality of times, and each transmitting end user equipment 400 may also report a neighbor D2D link to the base station for a plurality of times. The neighbor link management unit 511 of the base station 500 may collate the neighbor D2D links. For example, a union of neighbor D2D links transmitted for a plurality of times by a transmitting end user equipment of a D2D link and neighbor D2D links transmitted for a plurality of times by a receiving end user equipment of the D2D link is taken as a final neighbor D2D link of the D2D link. Next, the resource configuration unit 512 may configure resources for a receiving end user equipment and a transmitting end user equipment of each D2D link based on the neighbor D2D link of each D2D link.

According to the embodiment of the present disclosure, the wireless communication system includes a plurality of base stations 500. Each of the plurality of D2D links includes a transmitting end user equipment and a receiving end user equipment.

According to the embodiment of the present disclosure, the base station 500 may be in a dense scenario. For example, base station 500 may be in the dense non-public security scenario described above. In the dense scenario, the number of the D2D links in the wireless communication system exceeds a preset threshold.

Figure 6:
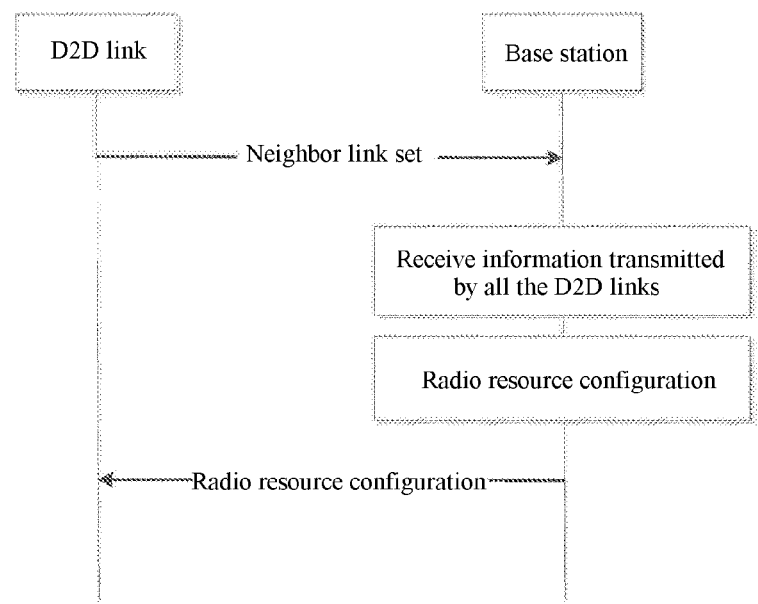
FIG. 6 is a schematic diagram showing signaling interactions between a base station and a D2D link according to an embodiment of the present disclosure.

FIG. 6 is a schematic diagram showing signaling interactions between a base station and a D2D link according to an embodiment of the present disclosure.

As shown in FIG. 6, firstly, each D2D link transmits a neighbor link set to a base station. In this embodiment, either a transmitting end user equipment or a receiving end user equipment of each D2D link may transmit the neighbor link set to the base station. Next, the base station receives the neighbor D2D link sets transmitted by all the D2D links, and collates the received neighbor D2D link sets to determine a neighbor D2D link of each D2D link. Next, the base station configures radio resources based on the neighbor D2D link of each D2D link. Finally, the base station transmits the radio resource configuration information to the transmitting end user equipment and the receiving end user equipment of each D2D link.

Figure 7:
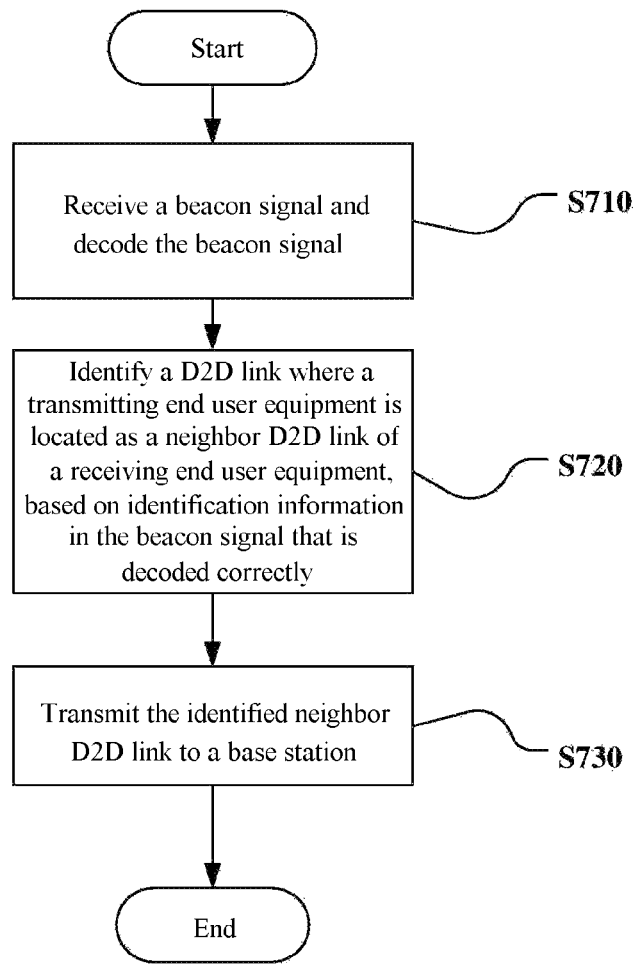
FIG. 7 is a flowchart showing a wireless communication method according to an embodiment of the present disclosure.

Next, a wireless communication method in a wireless communication system according to an embodiment of the present disclosure is described with reference to FIG. 7. FIG. 7 shows a flowchart of a wireless communication method according to an embodiment of the present disclosure. The method is used for performing D2D communication in the wireless communication system. The wireless communication system includes a plurality of D2D links.

As shown in FIG. 7, firstly, in step S710, a beacon signal transmitted by a transmitting end user equipment performing the D2D communication in the wireless communication system is received, and the received beacon signal is decoded. The beacon signal includes identification information for identifying a D2D link where the transmitting end user equipment is located.

Next, in step S720, based on the identification information in the beacon signal that is decoded correctly, the D2D link where the transmitting end user equipment is located is identified as a neighbor D2D link of a receiving end user equipment.

Next, in step S730, the identified neighbor D2D link is transmitted to a base station in the wireless communication system.

Preferably, the method further includes: monitoring each resource block in a resource pool of the wireless communication system. The resource block is used to transmit the beacon signal.

Preferably, the method further includes: acquiring the beacon signal that is not decoded correctly, and identifying the resource block for transmitting the beacon signal that is not decoded correctly as a resource block in which a conflict occurs; and transmitting a feedback signal via the resource block in which a conflict occurs. The feedback signal includes identification information for identifying a D2D link where the receiving end user equipment is located.

Preferably, the method further includes: selecting a frame randomly; and transmitting the feedback signal via the resource block in which a conflict occurs in the randomly selected frame.

Preferably, the method further includes: generating a random integer $m_q$; and selecting an $m_q$-th frame after a time when the random integer $m_q$ is generated as the randomly selected frame.

Preferably, the wireless communication system includes a plurality of base stations, and each of the plurality of D2D links includes a transmitting end user equipment and a receiving end user equipment.

Preferably, the method further includes: triggering the above method each time when a timer expires.

Figure 8:
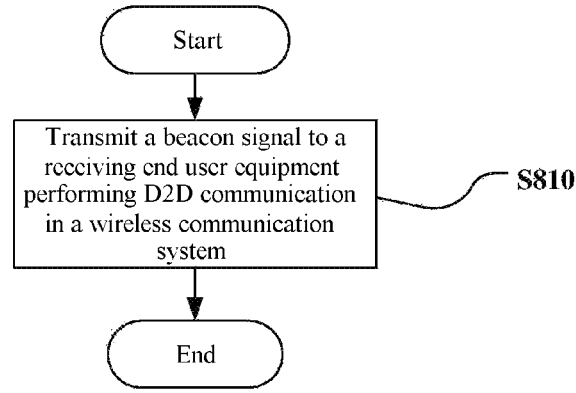
FIG. 8 is a flowchart showing a wireless communication method according to another embodiment of the present disclosure.

Next, a wireless communication method in a wireless communication system according to another embodiment of the present disclosure is described with reference to FIG. 8. FIG. 8 shows a flowchart of a wireless communication method according to another embodiment of the present disclosure. The method is used for performing D2D communication in the wireless communication system. The wireless communication system includes a plurality of D2D links.

As shown in FIG. 8, in step S810, a beacon signal is transmitted to a receiving end user equipment performing the D2D communication in the wireless communication system. The beacon signal includes identification information for identifying a D2D link where a transmitting end user equipment is located.

Preferably, the method further includes: randomly selecting a resource block from a resource pool of the wireless communication system; and transmitting the beacon signal via the selected resource block.

Preferably, the method further includes: generating a random number; comparing the generated random number with a preset threshold; and transmitting the beacon signal in a case that the generated random number is greater than the preset threshold.

Preferably, the method further includes: monitoring the randomly selected resource block; receiving a feedback signal transmitted via the randomly selected resource block by the receiving end user equipment performing the D2D communication in the wireless communication system, and decoding the received feedback signal, where the feedback signal includes identification information for identifying a D2D link where the receiving end user equipment is located; identifying the D2D link where the receiving end user equipment is located as a neighbor D2D link of the transmitting end user equipment, based on the identification information in the feedback signal that is decoded correctly; and transmitting the identified neighbor D2D link to a base station in the wireless communication system.

Preferably, the method further includes: repeatedly transmitting the beacon signal to the receiving end user equipment performing the D2D communication in the wireless communication system, in a case that there is feedback signal which is not decoded correctly.

Preferably, the wireless communication system includes a plurality of base stations, and each of the plurality of D2D links includes a transmitting end user equipment and a receiving end user equipment.

Preferably, the method further includes: triggering the above method each time when a timer expires.

Preferably, the method further includes: determining whether a flag variable is ON; and generating a random number in a case that the flag variable is ON. The flag variable is initialized to be ON each time when the timer expires.

Preferably, the method further includes: flagging the flag variable as OFF in a case that there is no feedback signal which is not decoded correctly.

Figure 9:
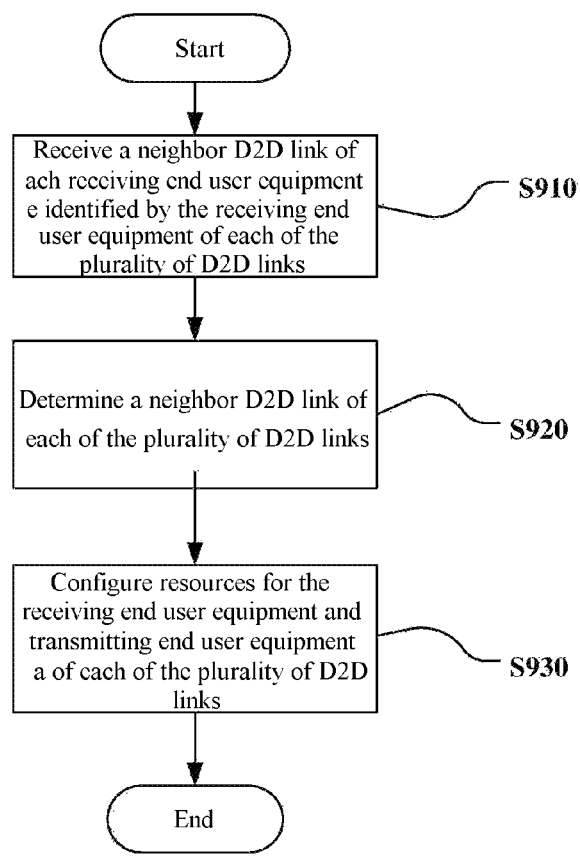
FIG. 9 is a flowchart showing a wireless communication method according to another embodiment of the present disclosure.

Next, a wireless communication method in a wireless communication system according to another embodiment of the present disclosure is described with reference to FIG. 9. FIG. 9 shows a flowchart of a wireless communication method according to another embodiment of the present disclosure. The method is used for performing D2D communication in the wireless communication system. The wireless communication system includes a plurality of D2D links.

As shown in FIG. 9, firstly, in step S910, a neighbor D2D link of each receiving end user equipment identified by the receiving end user equipment of each of the a plurality of D2D links is received.

Next, in step S920, a neighbor D2D link of each of the plurality of D2D links is determined based on the received neighbor D2D link of each receiving end user equipment.

Next, in step S930, based on the neighbor D2D link of each of the plurality of D2D links, resources are configured for the receiving end user equipment and a transmitting end user equipment of each of the plurality of D2D links, for the D2D communication.

Preferably, the method further includes: receiving a neighbor D2D link of each transmitting end user equipment identified by the transmitting end user equipment of each of the plurality of D2D links; determining a neighbor D2D link of each of the plurality of D2D links based on the received neighbor D2D link of each receiving end user equipment and the received neighbor D2D link of each transmitting end user equipment; and configuring, based on the neighbor D2D link of each of the plurality of D2D links, resources for the receiving end user equipment and the transmitting end user equipment of each of the plurality of D2D links, for the D2D communication.

Preferably, the method further includes: configuring resources so that the D2D link does not transmit information simultaneously with the neighbor D2D link of the D2D link.

Preferably, the method further includes: configuring resources so that the D2D link transmits information simultaneously with other D2D links than the neighbor D2D link of the D2D link.

Preferably, the wireless communication system includes a plurality of base stations, and each of the plurality of D2D links includes a transmitting end user equipment and a receiving end user equipment.

Various specific implementations of the above steps of a wireless communication method in a wireless communication system according to the embodiments of the present disclosure have been described above in detail, which are not repeated herein.

In order to better understand the present disclosure, how to determine a neighbor D2D link of each D2D link is described below in more detail below by two implementations.

First Implementation

Figure 10:
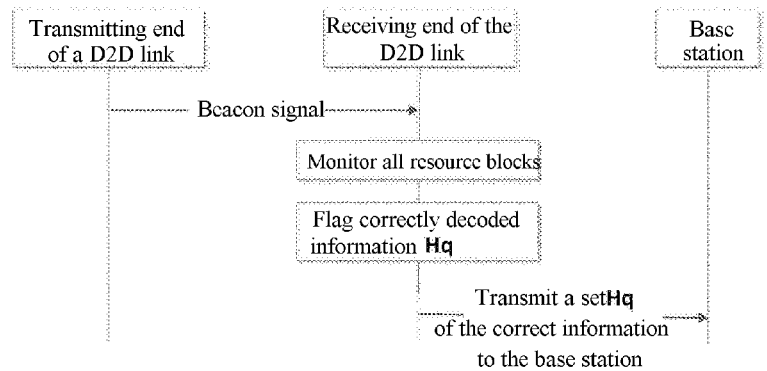
FIG. 10 is a schematic diagram showing signaling interactions between a user equipment and a base station in a first implementation according to the present disclosure.

FIG. 10 is a schematic diagram showing signaling interactions between a user equipment and a base station in a first implementation according to the present disclosure.

As shown in FIG. 10, firstly, a transmitting end of each D2D link generates a random number. In a case that the random number is greater than a threshold p, the transmitting end of the D2D link randomly selects a resource block from a resource pool to transmit a beacon signal via the selected resource block. Information carried in the beacon signal may be used to identify the D2D link.

Next, a receiving end of each D2D link monitors each resource block in the resource pool to determine whether a beacon signal is transmitted via the resource block.

Next, the receiving end of each D2D link decodes the beacon signal and records information for identifying the D2D link carried in the beacon signal that is decoded correctly. The recorded information is stored in $H_q$.

Next, the receiving end of each D2D link reports the information in the $H_q$ to a base station, and the base station may acquire a neighbor D2D link of each D2D link based on the $H_q$.

Second Implementation

Figure 11:
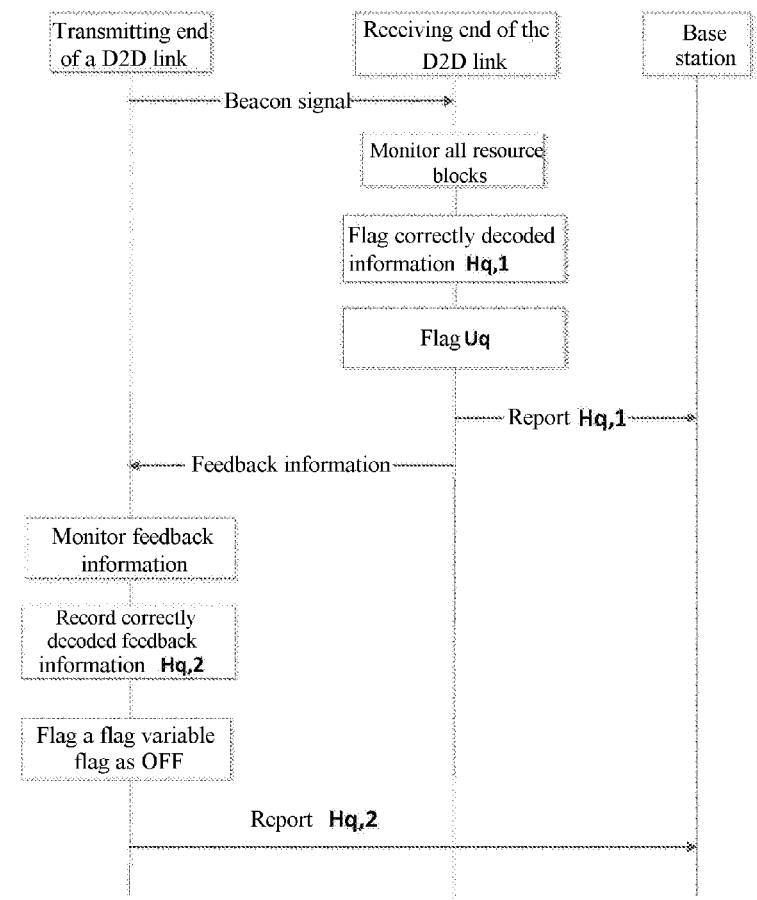
FIG. 11 is a schematic diagram showing signaling interactions between a user equipment and a base station in a second implementation according to the present disclosure.

FIG. 11 is a schematic diagram showing signaling interactions between a user equipment and a base station in a second implementation according to the present disclosure.

In the embodiment shown in FIG. 11, a timer is set for each D2D link so that each D2D link performs a process of searching for a neighbor link set at intervals to acquire a latest neighbor link set of the D2D link. Further, a flag variable flag related to a transmitting end of each D2D link is set, and the flag variable flag is initialized to be ON in each operation cycle. A process of determining a neighbor D2D link in the second implementation includes two steps. A first step is an announcement stage which occupies one frame. A second step is a conflict resolution stage which occupies M frames.

Announcement Stage

Firstly, a transmitting end of a D2D link of which the flag variable flag is ON randomly selects a resource block from a resource pool to transmit a beacon signal via the selected resource block. It is assumed that a resource block selected by a transmitting end of a D2D link q may be indicated by $n_q$. The beacon signal transmitted via the resource block may be used to identify the D2D link.

Next, a receiving end of each D2D link needs to monitor each resource block in the resource pool to determine whether a beacon signal is transmitted via the resource block.

Next, the receiving end of each D2D link acquires the beacon signal transmitted via the resource block and decodes the acquired beacon signal. Then the receiving end of the D2D link records the identification information of the D2D link in the beacon signal that is decoded correctly. A set of information acquired by the link q may be indicated by $H_{q,1}$.

Next, in a case that the receiving end of the D2D link can monitor the beacon signal but cannot decode the beacon signal correctly, the receiving end records the resource block via which the beacon signal is transmitted. A conflict occurs in the resource block. A set of the resource blocks in which a conflict occurs monitored by the receiving end of the link q may be indicated by $U_q$.

Next, the receiving end of each D2D link reports the $H_{q,1}$ to a base station.

Conflict Resolution Stage

The receiving end of the D2D link recording the resource block in which a conflict occurs generates a random integer $m_q$ ranging from 1 to M, and then transmits a feedback signal via the resource block in the $U_q$ in an $m_q$-th frame after a time when the random integer is generated. Information carried in the feedback signal may be used to identify the D2D link transmitting the information.

Next, the transmitting end of each D2D link of which the flag variable flag is ON monitors the resource block $n_q$ to determine whether a feedback signal is transmitted via the resource block $n_q$.

Next, the transmitting end of each D2D link of which the flag variable flag is ON acquires the feedback signal and decodes the acquired feedback signal, and records information for identifying the D2D link carried in the feedback signal that is decoded correctly. The information for identifying the D2D link recorded by the D2D link q may be indicated by $H_{q,2}$.

Next, in a case that there is feedback signal which is not decoded correctly, the above steps are performed from the announcement stage again. In a case that all the feedback signals are decoded correctly, the transmitting end of the D2D link q flags the flag variable flag as OFF.

Next, the transmitting end reports the information $H_{q,2}$ to the base station.

Then the base station collates the information $H_{q,1}$ and $H_{q,2}$ reported by the transmitting ends and the receiving ends of all the D2D links to determine neighbor D2D links of all the D2D links.

As described above, the second implementation which includes a "conflict resolution stage" is more complicated than the first implementation. Actually, the first implementation is a special example in which only operations in the "announcement stage" are performed in the second implementation.

As described above, the user equipment, the base station and the wireless communication method according to the present disclosure are described in more detail by the first implementation and the second implementation. However, those skilled in the art should understand that the present disclosure is not limited to the two embodiments.

Performance comparisons between the first implementation and the second implementation are described below with reference to FIG. 12 to FIG. 14.

In order to better illustrate technical effects of the present disclosure, the first implementation and the second implementation are simulated in the present disclosure. In the simulation process, a radius of a cellular cell is set as 300 meters, the number of D2D links in each cell is set as Q=500, a maximum distance between a transmitting end and a receiving end of each of the D2D links is set as $d_{max}$=50 meters, and a size of a resource pool is 50. A value of a parameter p in the first implementation is set as 0.5. A value of the M in the second implementation is set as 2.

In the simulation process, Q D2D links are firstly generated. For any one D2D link i, a location of the transmitting end is randomly generated in a range of the cell, a distance $d_i$ between the transmitting end and the receiving end of the D2D link is randomly selected as a value ranging from 1 to $d_{max}$, and a direction of the D2D link is randomly generated to determine a location of the receiving end.

In the simulation process, an actual neighbor set of each D2D link needs to be determined. A broadcast radius of the D2D link i is indicated by $r_i$. For simplicity and without loss of generality, the $r_i$ may be calculated from a formula $r_i$=w·$d_i$, wherein w is a coefficient. In the simulation process, the w is set as 2 unless otherwise specified. It is assumed that a broadcast radius of the transmitting end is the same as a broadcast radius of the receiving end, i.e., both are $r_i$. For any two D2D links i and j, a distance between a transmitting end of the link i and a receiving end of the link j is indicated by $d_{ij}$. In the case of $d_{ij}$<$r_i$, it is determined that the two links are actual neighbor D2D links of each other.

As compared with the neighbor D2D links determined by using the method and device according to the present disclosure, in a case that the actual neighbor D2D links are converged, the number of required frames is calculated. In the present disclosure, curves in which the number of frames required to complete convergence changes with the size N of the resource pool, the number Q of the D2D links, and the maximum distance $d_{max}$ of the D2D link are determined by the simulation process. It can be seen that the technical effects of the present disclosure are achieved.

Figure 12:
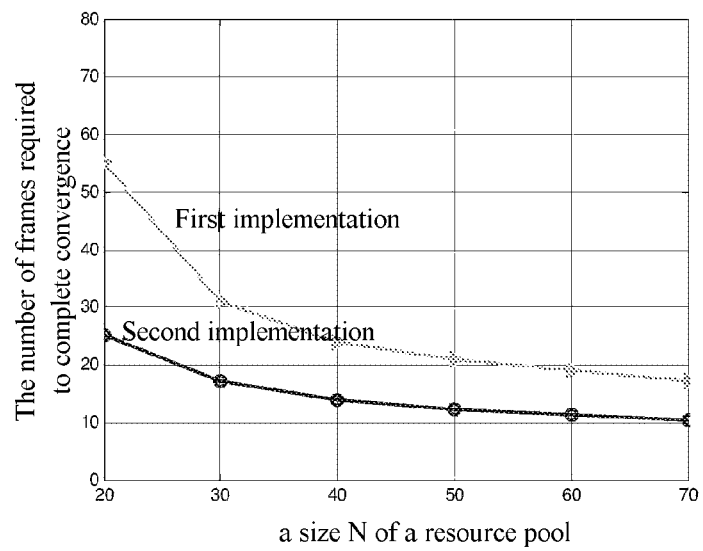
FIG. 12 is a schematic diagram showing a performance comparison between the first implementation and the second implementation according to the present disclosure.

FIG. 12 shows a curve in which the number of frames required to complete the convergence changes with the size N of the resource pool. The simulation result shows that, the number of frames required to complete the convergence decreases as the size N of the resource pool increases. In addition, in a case that the capacity of the resource pool is small, the performance advantage of the second implementation is more obvious than that of the first implementation. FIG. 13 shows a curve in which the number of frames required to complete the convergence changes with the number Q of the D2D links. The simulation result shows that, the number of frames required to complete the convergence increases as the number Q of the D2D links increases. In addition, in a case that the number of the D2D links is large, a rate of a rise in the number of frames required to complete the convergence of the first implementation is greater than that of the second implementation, that is, the stability of the first implementation is less than that of the second implementation. Therefore, the second implementation is more applicable in a dense region with a large number of D2D links than the first implementation. FIG. 14 shows a curve in which the number of frames required to complete the convergence changes with the maximum distance $d_{max}$ of the D2D link. The simulation result shows that, the number of frames required to complete the convergence increases as the $d_{max}$ increases. In addition, in a case that the value of the $d_{max}$ is large, the second implementation is more applicable than the first implementation.

Figure 13:
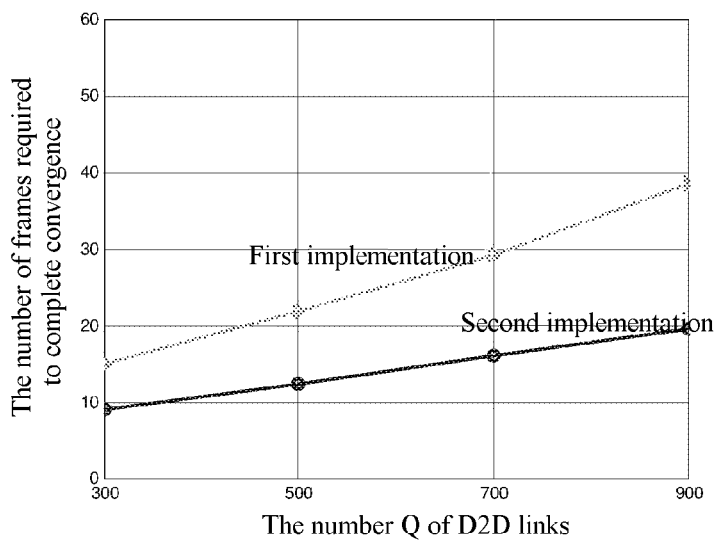
FIG. 13 is schematic diagram showing a performance comparison between the first implementation and the second implementation according to the present disclosure.
Figure 14:
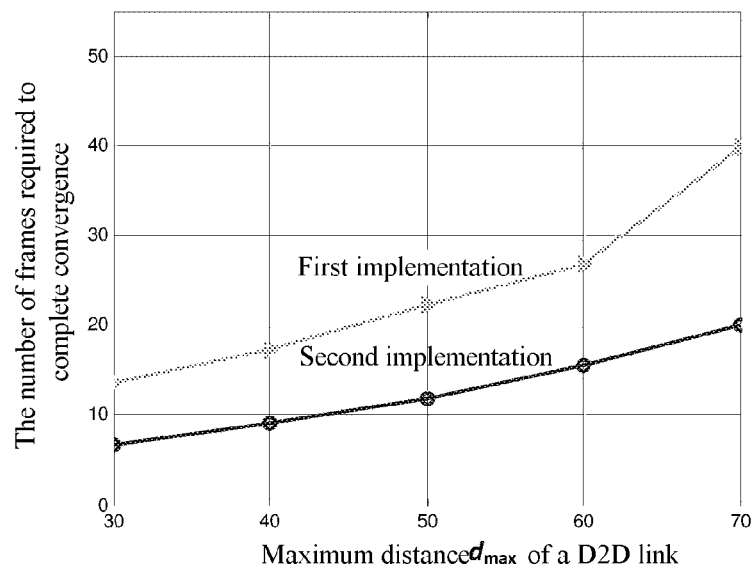
FIG. 14 is schematic diagram showing a performance comparison between the first implementation and the second implementation according to the present disclosure.

As shown in FIG. 12 to FIG. 14, in a case that at least one of the size N of the resource pool, the number Q of D2D links, and the maximum distance $d_{max}$ of the D2D link changes, the convergence can be completed by using a fewer number of frames both in the first implementation and the second implementation. It can be seen that, with the user equipment, the base station and the wireless communication method according to the embodiments of the present disclosure, the base station can accurately determine a neighbor D2D link of each D2D link in a fewer number of frames, thereby more reasonably configuring resources, and thus improving the effectiveness of the D2D communication and the system capacity.

The technology according to the present disclosure can be applied to various types of products. For example, the base station mentioned in the present disclosure may be implemented as any type of evolution Node B (eNB), such as a macro eNB and a small eNB. The small eNB may be an eNB covering a cell smaller than a macro cell, such as a pico eNB, a micro eNB or a home (femto) eNB. Alternatively, the base station may be implemented as any other type of base station, such as a NodeB and a base transceiver station (BTS). The base station may include: a main body (also referred to as a base station apparatus) configured to control wireless communication; and one or more remote radio heads (RRH) arranged at positions different from the main body. In addition, various types of terminals described below may operate as a base station by performing functions of the base station temporarily or in a semi-persistent manner.

For example, the UE mentioned in the present disclosure may be implemented as a mobile terminal (such as a smartphone, a tablet personal computer (PC), a notebook PC, a portable game terminal, a portable/dongle mobile router and a digital camera device) or an in-vehicle terminal (such as a car navigation apparatus). The UE may also be implemented as a terminal (also referred to as a machine-type communication (MTC) terminal) performing machine to machine (M2M) communication. In addition, the UE may be a wireless communication module (such as an integrated circuit module including a single chip) installed on each of the above terminals.

Figure 15:
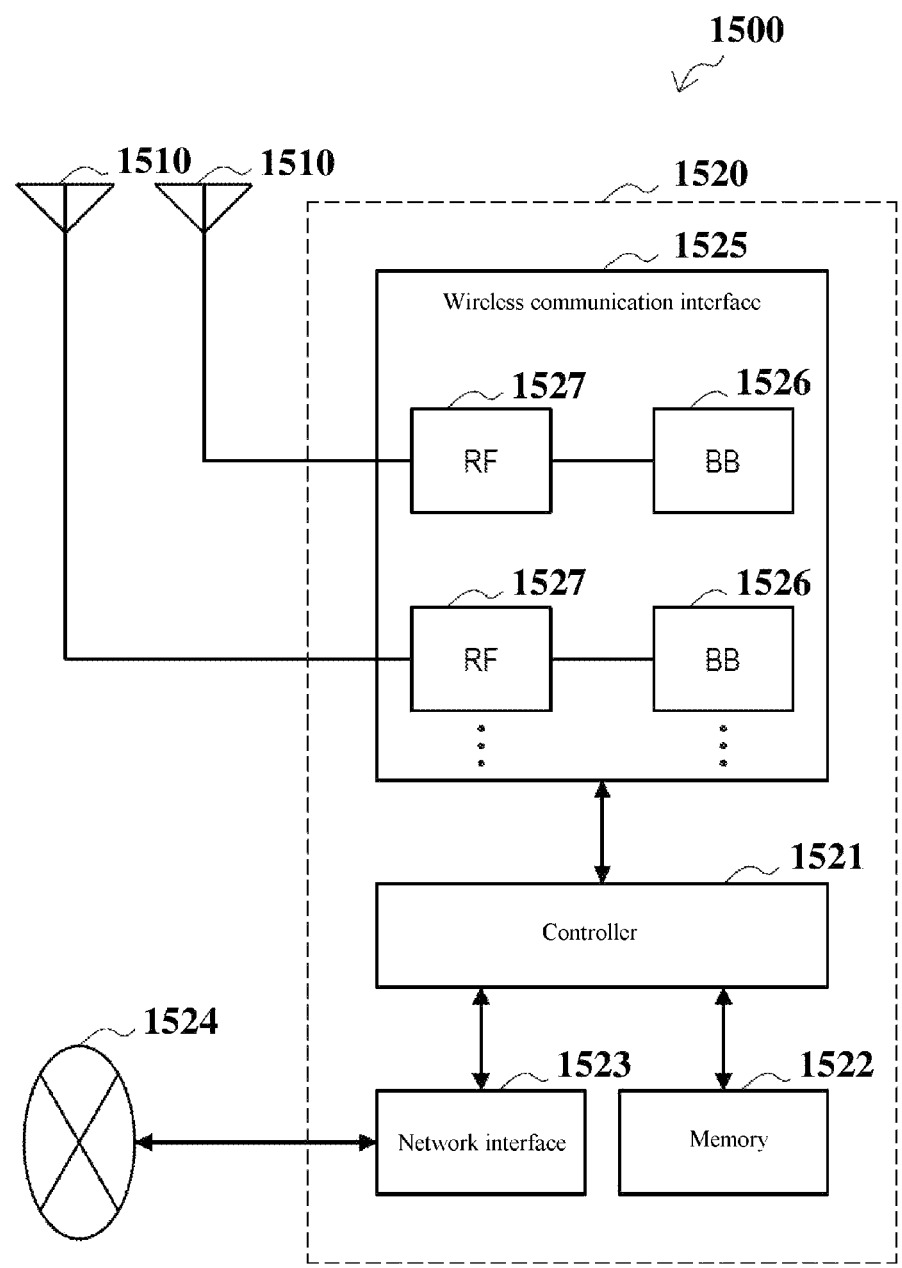
FIG. 15 is a block diagram showing a first schematic configuration example of an evolution node base station (eNB) to which the present disclosure may be applied.

FIG. 15 is a block diagram showing a first schematic configuration example of an eNB to which the technology of the present disclosure may be applied. An eNB 1500 includes one or more antennas 1510 and a base station apparatus 1520. Each antenna 1510 and the base station apparatus 1520 may be connected to each other via an RF cable.

Each of the antennas 1510 includes a single or a plurality of antenna elements (such as a plurality of antenna elements included in an MIMO antenna), and is used for the base station apparatus 1520 to transmit and receive radio signals. As shown in FIG. 15, the eNB 1500 may include the plurality of antennas 1510. For example, the plurality of antennas 1510 may be compatible with a plurality of frequency bands used by the eNB 1500. Although FIG. 15 shows the example in which the eNB 1500 includes the plurality of antennas 1510, the eNB 1500 may also include a single antenna 1510.

The base station apparatus 1520 includes a controller 1521, a memory 1522, a network interface 1523, and a wireless communication interface 1525.

The controller 1521 may be, for example, a CPU or a DSP, and operates various functions of a higher layer of the base station apparatus 1520. For example, the controller 1521 generates a data packet from data in signals processed by the wireless communication interface 1525, and transfers the generated packet via the network interface 1523. The controller 1521 may bundle data from a plurality of base band processors to generate the bundled packet, and transfer the generated bundled packet. The controller 1521 may have logical functions of performing control such as radio resource control, radio bearer control, mobility management, admission control and scheduling. The control may be performed in corporation with an eNB or a core network node in the vicinity. The memory 1522 includes a RAM and a ROM, and stores a program executed by the controller 1521, and various types of control data (such as a terminal list, transmission power data, and scheduling data).

The network interface 1523 is a communication interface for connecting the base station apparatus 1520 to a core network 1524. The controller 1521 may communicate with a core network node or another eNB via the network interface 1523. In that case, the eNB 1500, and the core network node or the other eNB may be connected to each other through a logical interface (such as an S1 interface and an X2 interface). The network interface 1523 may also be a wired communication interface or a wireless communication interface for wireless backhaul. If the network interface 1523 is a wireless communication interface, the network interface 1523 may use a higher frequency band for wireless communication than a frequency band used by the wireless communication interface 1525.

The wireless communication interface 1525 supports any cellular communication scheme (such as Long Term Evolution (LTE) and LTE-Advanced), and provides wireless connection to a terminal positioned in a cell of the eNB 1500 via the antenna 1510. The wireless communication interface 1525 may typically include, for example, a baseband (BB) processor 1526 and an RF circuit 1527. The BB processor 1526 may perform, for example, encoding/decoding, modulating/demodulating, and multiplexing/demultiplexing, and performs various types of signal processing of layers (such as L1, medium access control (MAC), wireless link control (RLC), and a packet data convergence protocol (PDCP)). The BB processor 1526 may have a part or all of the above-described logical functions instead of the controller 1521. The BB processor 1526 may be a memory that stores a communication control program, or a module that includes a processor and a related circuit configured to execute the program. Updating the program may allow the functions of the BB processor 1526 to be changed. The module may be a card or a blade that is inserted into a slot of the base station apparatus 1520. Alternatively, the module may also be a chip that is mounted on the card or the blade. Meanwhile, the RF circuit 1527 may include, for example, a mixer, a filter, and an amplifier, and transmits and receives wireless signals via the antenna 1510.

As shown in FIG. 15, the wireless communication interface 1525 may include the plurality of BB processors 1526. For example, the plurality of BB processors 1526 may be compatible with a plurality of frequency bands used by the eNB 1500. As shown in FIG. 15, the wireless communication interface 1525 may include the plurality of RF circuits 1527. For example, the plurality of RF circuits 1527 may be compatible with a plurality of antenna elements. Although FIG. 15 shows the example in which the wireless communication interface 1525 includes the plurality of BB processors 1526 and the plurality of RF circuits 1527, the wireless communication interface 1525 may also include a single BB processor 1526 or a single RF circuit 1527.

Figure 16:
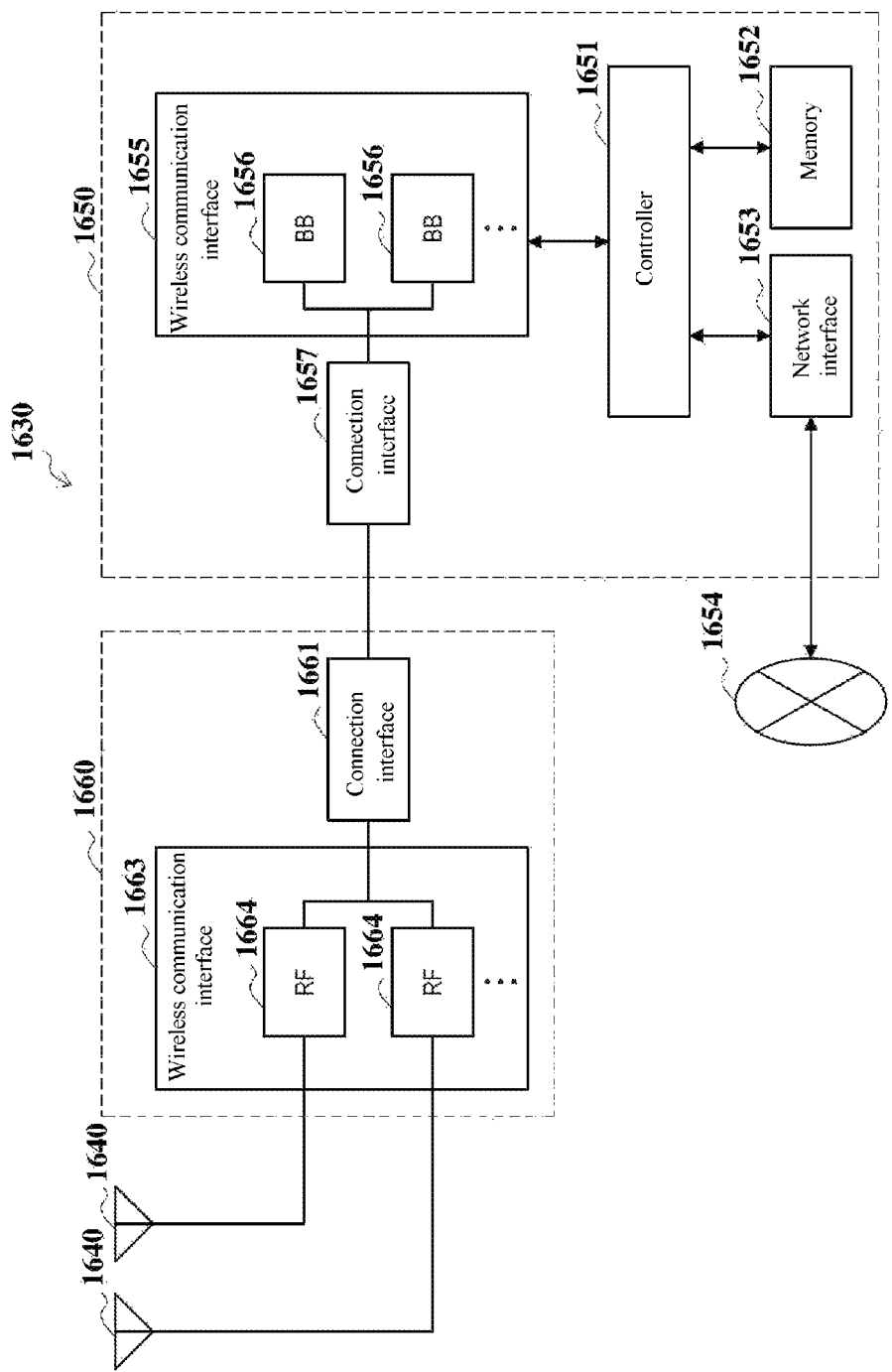
FIG. 16 is a block diagram showing a second schematic configuration example of an eNB to which the present disclosure may be applied.

FIG. 16 is a block diagram showing a second schematic configuration example of an eNB to which the technology of the present disclosure may be applied. An eNB 1630 includes one or more antennas 1640, a base station apparatus 1650, and an RRH 1660. Each antenna 1640 and the RRH 1660 may be connected to each other via an RF cable. The base station apparatus 1650 and the RRH 1660 may be connected to each other via a high speed line such as an optical fiber cable.

Each of the antennas 1640 includes a single or a plurality of antenna elements (such as a plurality of antenna elements included in an MIMO antenna), and is used for the RRH 1660 to transmit and receive radio signals. As shown in FIG. 16, the eNB 1630 may include the plurality of antennas 1640. For example, the plurality of antennas 1640 may be compatible with a plurality of frequency bands used by the eNB 1630. Although FIG. 16 shows the example in which the eNB 1630 includes the plurality of antennas 1640, the eNB 1630 may also include a single antenna 1640.

The base station apparatus 1650 includes a controller 1651, a memory 1652, a network interface 1653, a wireless communication interface 1655, and a connection interface 1657. The controller 1651, the memory 1652, and the network interface 1653 are the same as the controller 1521, the memory 1522, and the network interface 1523 described with reference to FIG. 15.

The wireless communication interface 1655 supports any cellular communication scheme (such as LTE and LTE-Advanced), and provides wireless communication to a terminal positioned in a sector corresponding to the RRH 1660 via the RRH 1660 and the antenna 1640. The wireless communication interface 1655 may typically include, for example, a BB processor 1656. The BB processor 1656 is the same as the BB processor 1526 described with reference to FIG. 15, except the BB processor 1656 is connected to the RF circuit 1664 of the RRH 1660 via the connection interface 1657. As shown in FIG. 16, the wireless communication interface 1655 may include the plurality of BB processors 1656. For example, the plurality of BB processors 1656 may be compatible with a plurality of frequency bands used by the eNB 1630. Although FIG. 16 shows the example in which the wireless communication interface 1655 includes the plurality of BB processors 1656, the wireless communication interface 1655 may also include a single BB processor 1656.

The connection interface 1657 is an interface for connecting the base station apparatus 1650 (wireless communication interface 1655) to the RRH 1660. The connection interface 1657 may also be a communication module for communication in the above-described high speed line that connects the base station apparatus 1650 (wireless communication interface 1655) to the RRH 1660.

The RRH 1660 includes a connection interface 1661 and a wireless communication interface 1663.

The connection interface 1661 is an interface for connecting the RRH 1660 (wireless communication interface 1663) to the base station apparatus 1650. The connection interface 1661 may also be a communication module for communication in the above-described high speed line.

The wireless communication interface 1663 transmits and receives wireless signals via the antenna 1640. The wireless communication interface 1663 may typically include, for example, the RF circuit 1664. The RF circuit 1664 may include, for example, a mixer, a filter, and an amplifier, and transmits and receives wireless signals via the antenna 1640. As shown in FIG. 16, the wireless communication interface 1663 may include a plurality of RF circuits 1664. For example, the plurality of RF circuits 1664 may support a plurality of antenna elements. Although FIG. 16 shows the example in which the wireless communication interface 1663 includes the plurality of RF circuits 1664, the wireless communication interface 1663 may also include a single RF circuit 1664.

In the eNB 1500 shown in FIG. 15 and the eNB 1630 shown in FIG. 16, the processing circuit 510 described with reference to FIG. 5 and the neighbor link management unit 511 and the resource configuration unit 512 in the processing circuit 510 may be implemented by the controller 1521 and/or the controller 1651, and the communication unit 520 described with reference to FIG. 5 may be implemented by the wireless communication interface 1525 and the wireless communication interface 1655 and/or the wireless communication interface 1663. At least a part of the functions may also be implemented by the controller 1521 and the controller 1651. For example, the controller 1521 and/or the controller 1651 may implement the functions of causing the communication unit 520 to receive a neighbor D2D link and configuring resources for a transmitting end and a receiving end of a D2D link by executing instructions stored in memories.

Figure 17:
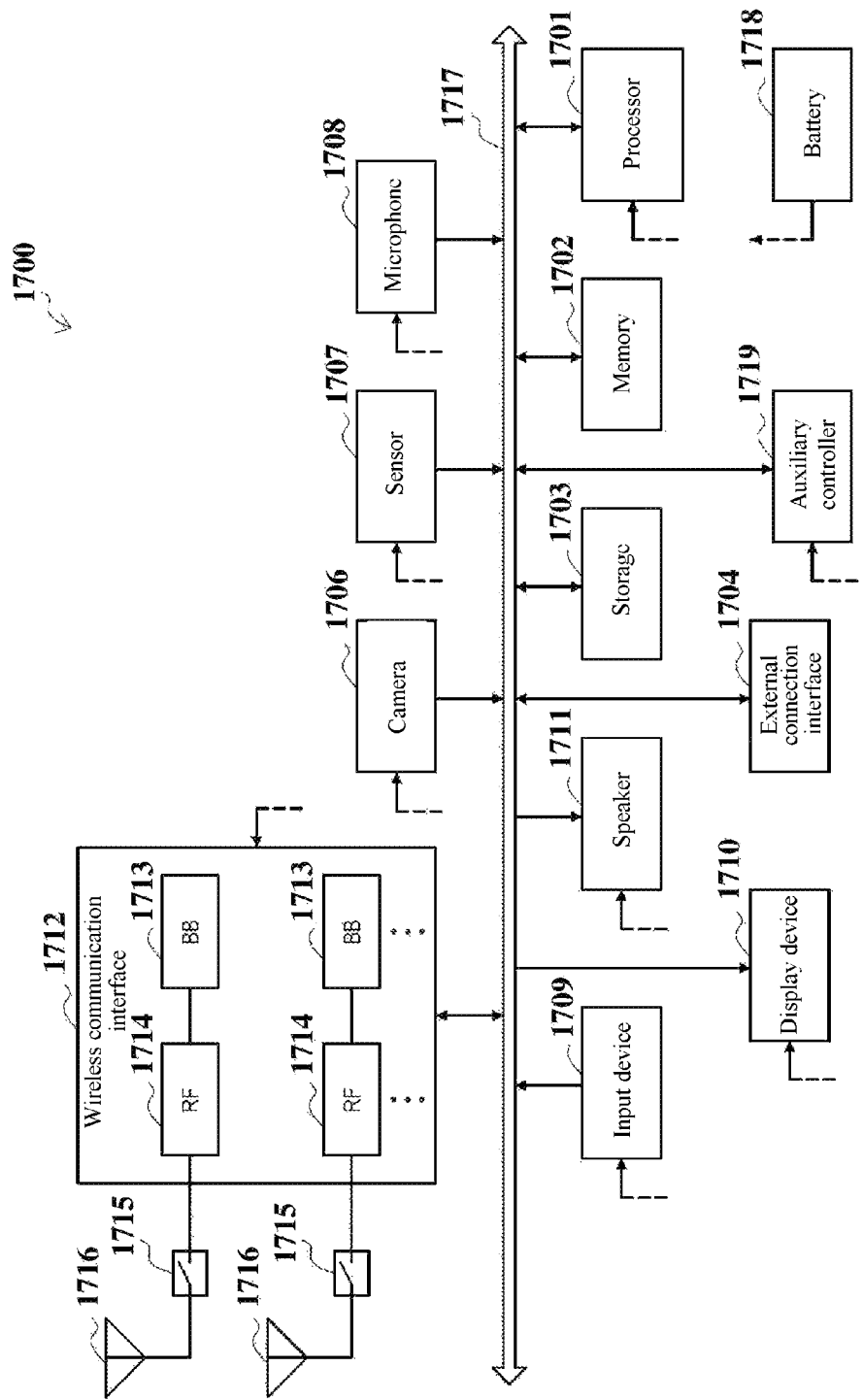
FIG. 17 is a block diagram showing a schematic configuration example of a smartphone to which the present disclosure may be applied.

FIG. 17 is a block diagram showing a schematic configuration example of a smartphone 1700 to which the technology of the present disclosure may be applied. The smartphone 1700 includes a processor 1701, a memory 1702, a storage 1703, an external connection interface 1704, a camera 1706, a sensor 1707, a microphone 1708, an input device 1709, a display device 1710, a speaker 1711, a wireless communication interface 1712, one or more antenna switches 1715, one or more antennas 1716, a bus 1717, a battery 1718, and an auxiliary controller 1719.

The processor 1701 may be, for example, a CPU or a system on a chip (SoC), and controls functions of an application layer and another layer of the smartphone 1700. The memory 1702 includes RAM and ROM, and stores a program that is executed by the processor 1701 and data. The storage 1703 may include a storage medium such as a semiconductor memory and a hard disk. The external connection interface 1704 is an interface for connecting an external device (such as a memory card and a universal serial bus (USB) device) to the smartphone 1700.

The camera 1706 includes an image sensor (such as a charge coupled device (CCD) and a complementary metal oxide semiconductor (CMOS)), and generates a captured image. The sensor 1707 may include a group of sensors such as a measurement sensor, a gyro sensor, a geomagnetic sensor and an acceleration sensor. The microphone 1708 converts sounds that are input to the smartphone 1700 to audio signals. The input device 1709 includes, for example, a touch sensor configured to detect touch onto a screen of the display device 1710, a keypad, a keyboard, a button or a switch, and receives an operation or an information input from a user. The display device 1710 includes a screen such as a liquid crystal display (LCD) and an organic light-emitting diode (OLED) display, and displays an output image of the smartphone 1700. The speaker 1711 converts audio signals outputted from the smartphone 1700 to sounds.

The wireless communication interface 1712 supports any cellular communication scheme such as LET and LTE-Advanced, and performs wireless communication. The wireless communication interface 1712 may typically include, for example, a BB processor 1713 and an RF circuit 1714. The BB processor 1713 may perform, for example, encoding/decoding, modulating/demodulating, and multiplexing/demultiplexing, and performs various types of signal processing for wireless communication. Meanwhile, the RF circuit 1714 may include, for example, a mixer, a filter and an amplifier, and transmits and receives wireless signals via the antenna 1716. The wireless communication interface 1712 may be a one chip module having the BB processor 1713 and the RF circuit 1714 integrated thereon. As shown in FIG. 17, the wireless communication interface 1712 may include the plurality of BB processors 1713 and the plurality of RF circuits 1714. Although FIG. 17 shows the example in which the wireless communication interface 1712 includes the plurality of BB processors 1713 and the plurality of RF circuits 1714, the wireless communication interface 1712 may also include a single BB processor 1713 or a single RF circuit 1714.

Furthermore, in addition to a cellular communication scheme, the wireless communication interface 1712 may support another type of wireless communication scheme such as a short-distance wireless communication scheme, a near field communication scheme, and a wireless local area network (LAN) scheme. In that case, the wireless communication interface 1712 may include the BB processor 1713 and the RF circuit 1714 for each wireless communication scheme.

Each of the antenna switches 1715 switches connection destinations of the antennas 1716 among a plurality of circuits (such as circuits for different wireless communication schemes) included in the wireless communication interface 1712.

Each of the antennas 1716 includes a single or a plurality of antenna elements (such as a plurality of antenna elements included in an MIMO antenna), and is used for the wireless communication interface 1712 to transmit and receive wireless signals. As shown in FIG. 17, the smartphone 1700 may include the plurality of antennas 1716. Although FIG. 17 shows the example in which the smartphone 1700 includes the plurality of antennas 1716, the smartphone 1700 may also include a single antenna 1716.

Furthermore, the smartphone 1700 may include the antenna 1716 for each wireless communication scheme. In that case, the antenna switches 1715 may be omitted from the configuration of the smartphone 1700.

The bus 1717 connects the processor 1701, the memory 1702, the storage 1703, the external connection interface 1704, the camera 1706, the sensor 1707, the microphone 1708, the input device 1709, the display device 1710, the speaker 1711, the wireless communication interface 1712, and the auxiliary controller 1719 to each other. The battery 1718 supplies power to blocks of the smartphone 1700 shown in FIG. 17 via feeder lines, which are partially shown as dashed lines in the FIG. 17. The auxiliary controller 1719 operates a minimum necessary function of the smartphone 1700, for example, in a sleep mode.

In the smartphone 1700 shown in FIG. 17, the processing circuit 210 described with reference to FIG. 2 and the decoding unit 211 and the identifying unit 212 in the processing circuit 210, and the processing circuit 410 described with reference to FIG. 4 and the processing unit 411 in the processing circuit 410 may be implemented by the processor 1701 or the auxiliary controller 1719, and the communication unit 220 described with reference to FIG. 2 and the communication unit 420 described with reference to FIG. 4 may be implemented by the wireless communication interface 1712. At least a part of the functions may also be implemented by the processor 1701 or the auxiliary controller 1719. For example, the processor 1701 or the auxiliary controller 1719 can implement the functions of decoding a beacon signal, identifying a neighbor D2D link, and causing the communication unit 420 to transmit the beacon signal by executing instructions stored in the memory 1702 or the storage 1703.

Figure 18:
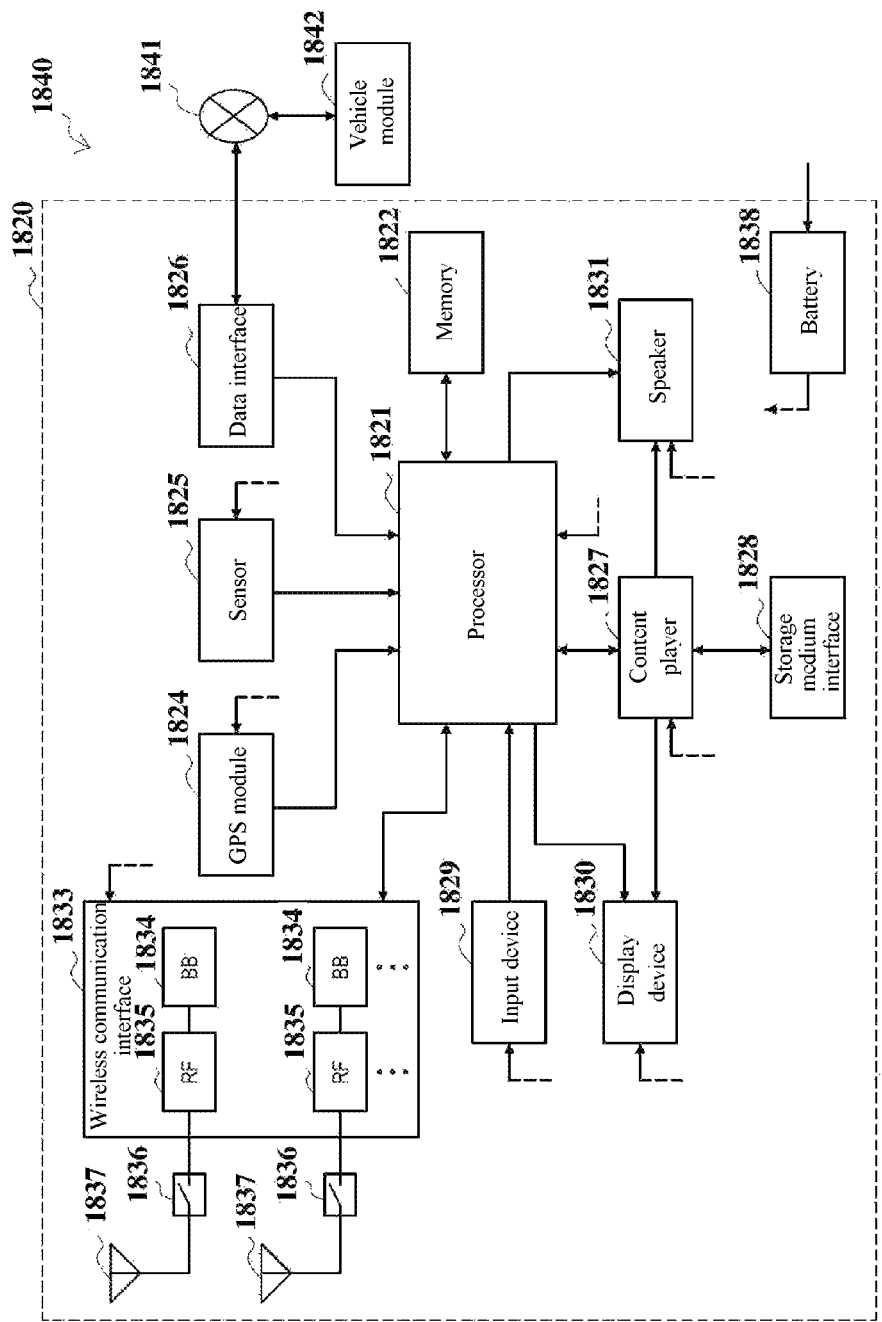
FIG. 18 is a block diagram showing a schematic configuration example of a car navigation apparatus to which the present disclosure may be applied.

FIG. 18 is a block diagram showing a schematic configuration example of a car navigation apparatus 1820 to which the technology of the present disclosure may be applied. The car navigation apparatus 1820 includes a processor 1821, a memory 1822, a global positioning system (GPS) module 1824, a sensor 1825, a data interface 1826, a content player 1827, a storage medium interface 1828, an input device 1829, a display device 1830, a speaker 1831, a wireless communication interface 1833, one or more antenna switches 1836, one or more antennas 1837, and a battery 1838.

The processor 1821 may be, for example, a CPU or a SoC, and controls a navigation function and another function of the car navigation apparatus 1820. The memory 1822 includes a RAM and a ROM, and stores a program executed by the processor 1821, and data.

The GPS module 1824 uses GPS signals received from a GPS satellite to determine a position (such as latitude, longitude, and altitude) of the car navigation apparatus 1820. The sensor 1825 may include a group of sensors such as a gyro sensor, a geomagnetic sensor, and an air pressure sensor. The data interface 1826 is connected to, for example, an in-vehicle network 1841 via a terminal that is not shown, and acquires data (such as vehicle speed data) generated by the vehicle.

The content player 1827 reproduces content stored in a storage medium (such as a CD and a DVD) that is inserted into the storage medium interface 1828. The input device 1829 includes, for example, a touch sensor configured to detect touch onto a screen of the display device 1530, a button or a switch, and receives an operation or information inputted from a user. The display device 1830 includes a screen such as a LCD or an OLED display, and displays an image of the navigation function or content that is reproduced. The speaker 1831 outputs sounds of the navigation function or the content that is reproduced.

The wireless communication interface 1833 supports any cellular communication scheme (such as LTE and LTE-Advanced), and performs wireless communication. The wireless communication interface 1833 may typically include, for example, a BB processor 1834 and an RF circuit 1835. The BB processor 1834 may perform, for example, encoding/decoding, modulating/demodulating, and multiplexing/demultiplexing, and performs various types of signal processing for wireless communication. Meanwhile, the RF circuit 1835 may include, for example, a mixer, a filter, and an amplifier, and transmits and receives wireless signals via the antenna 1837. The wireless communication interface 1833 may also be a one chip module that has the BB processor 1834 and the RF circuit 1835 integrated thereon. As shown in FIG. 18, the wireless communication interface 1833 may include the plurality of BB processors 1834 and the plurality of RF circuits 1835. Although FIG. 18 shows the example in which the wireless communication interface 1833 includes the plurality of BB processors 1834 and the plurality of RF circuits 1835, the wireless communication interface 1833 may also include a single BB processor 1834 or a single RF circuit 1835.

Furthermore, in addition to the cellular communication scheme, the wireless communication interface 1833 may support another type of wireless communication scheme such as a short-distance wireless communication scheme, a near field communication scheme, and a wireless LAN scheme. In that case, the wireless communication interface 1833 may include the BB processor 1834 and the RF circuit 1835 for each wireless communication scheme.

Each of the antenna switches 1836 switches connection destinations of the antennas 1837 among a plurality of circuits (such as circuits for different wireless communication schemes) included in the wireless communication interface 1833.

Each of the antennas 1837 includes a single or a plurality of antenna elements (such as a plurality of antenna elements included in an MIMO antenna), and is used for the wireless communication interface 1833 to transmit and receive wireless signals. As shown in FIG. 18, the car navigation apparatus 1820 may include the plurality of antennas 1837. Although FIG. 18 shows the example in which the car navigation apparatus 1820 includes the plurality of antennas 1837, the car navigation apparatus 1820 may also include a single antenna 1837.

Furthermore, the car navigation apparatus 1820 may include the antenna 1837 for each wireless communication scheme. In that case, the antenna switches 1836 may be omitted from the configuration of the car navigation apparatus 1820.

The battery 1838 supplies power to blocks of the car navigation apparatus 1820 shown in FIG. 18 via feeder lines that are partially shown as dashed lines in the FIG. 18. The battery 1838 accumulates power supplied form the vehicle.

In the car navigation apparatus 1820 shown in FIG. 18, the processing circuit 210 described with reference to FIG.

2 and the decoding unit 211 and the identifying unit 212 in the processing circuit 210, and the processing circuit 410 described with reference to FIG. 4 and the processing unit 411 in the processing circuit 410 may be implemented by the processor 1821, and the communication unit 220 described with reference to FIG. 2 and the communication unit 420 described with reference to FIG. 4 may be implemented by the wireless communication interface 1833. At least a part of the functions may also be implemented by the processor 1821. For example, the processor 1821 can implement the functions of decoding a beacon signal, identifying a neighbor D2D link, and causing the communication unit 420 to transmit the beacon signal by executing instructions stored in the memory 1822.

The technology of the present disclosure may also be implemented as an in-vehicle system (or a vehicle) 1840 including one or more blocks of the car navigation apparatus 1820, the in-vehicle network 1841 and a vehicle module 1842. The vehicle module 1842 generates vehicle data (such as a vehicle speed, an engine speed or failure information), and outputs the generated data to the in-vehicle network 1841.

In the system and method according to the present disclosure, the respective components or steps can be decomposed and/or recombined. These decompositions and/or recombination shall be regarded as equivalent solutions of the present disclosure. Moreover, steps for executing the above series of processing can naturally be executed chronologically in the sequence as described above, but is not limited thereto, and some of the steps can be performed in parallel or individually.

Although the embodiments of the present disclosure have been described above in detail in connection with the drawings, it shall be appreciated that the embodiments as described above are merely illustrative rather than limitative for the present disclosure. Those skilled in the art can make various modifications and variations to the above embodiments without departing from the spirit and scope of the present disclosure. Therefore, the scope of the present disclosure is defined merely by the appended claims and their equivalents.

What is claimed is:

1. A user equipment for performing D2D communication in a wireless communication system, the wireless communication system comprising a plurality of D2D links, the user equipment being used as a receiving end user equipment of a D2D link, the receiving end user equipment comprising:
   a transceiver, and
   one or more processing circuits configured to:
      cause the transceiver to receive a plurality of beacon signals transmitted by a transmitting end user equipment performing the D2D communication in the wireless communication system, and decode the received beacon signals, wherein each of the beacon signals, comprises identification information for identifying a D2D link where the transmitting end user equipment is located;
      identify, among the plurality of beacon signals, a beacon signal that is decoded correctly;
      determine whether there is a beacon signal among the plurality of beacon signals that is not decoded correctly and, if so, identify the beacon signal that is not decoded correctly;
      identify the D2D link where the transmitting end user equipment is located as a neighbor D2D link of the receiving end user equipment, based on the identification information in the beacon signal that is decoded correctly; and
      cause the transceiver to transmit the identified neighbor D2D link to a base station in the wireless communication system.

2. The user equipment according to claim 1, wherein the processing circuit is further configured to monitor each resource block among a plurality of resource blocks in a resource pool of the wireless communication system, wherein the plurality of resource blocks are used to transmit the plurality of beacon signals.

3. The user equipment according to claim 2, wherein the processing circuit is further configured to:
   acquire the beacon signal that is not decoded correctly, and identify the resource block for transmitting the beacon signal that is not decoded correctly as a resource block in which a conflict occurs; and
   cause the transceiver to transmit a feedback signal via the resource block in which the conflict occurs, wherein the feedback signal comprises identification information for identifying a D2D link where the receiving end user equipment is located.

4. The user equipment according to claim 3, wherein for causing the transceiver to transmit the feedback signal via the resource block in which the conflict occurs, the processing circuit is further configured to:
   select a frame randomly; and
   cause the transceiver to transmit the feedback signal via the resource block in which the conflict occurs in the randomly selected frame.

5. The user equipment according to claim 4, wherein for selecting the frame randomly, the processing circuit is further configured to:
   generate a random integer $m_q$; and
   select an $m_q$-th frame after a n when the random integer $m_q$ is generated as the randomly selected frame.

6. A user equipment for performing D2D communication in a wireless communication system, the wireless communication system comprising a plurality of D2D links, the user equipment being used as a transmitting end user equipment of a D2D link, the transmitting end user equipment comprising:
   a transceiver, and
   one or more processing circuits configured to:
      cause the transceiver to transmit a beacon signal to a receiving end user equipment performing the D2D communication in the wireless communication system, wherein the beacon signal comprises identification information for identifying a D2D link where the transmitting end user equipment is located;
      cause the transceiver to receive a plurality of feedback signals transmitted by the receiving end user equipment performing the D2D communication in the wireless communications stem, and decode the plurality of received feedback signals, wherein each of the feedback signals comprises identification information for identifying a D2D link Where the receiving end user equipment is located;
      identify, among the plurality of feedback signals, a feedback signal that is decoded correctly; and
      determine whether there is a feedback signal among the plurality of feedback signals that is not decoded correctly and, if so, identify the feedback signal that is not decoded correctly.

7. The user equipment according to claim 6, wherein the processing circuit is further configured to:

select a resource block from a resource pool of the wireless communication system randomly; and cause the transceiver to transmit the beacon signal via the selected resource block.

8. The user equipment according to claim 6, wherein the processing circuit is further configured to:

generate a random number;

compare the generated random number with a preset threshold; and transmit the beacon signal in a case that the generated random number is greater than the preset threshold.

9. The user equipment according to claim 8, wherein the processing circuit comprises a timer, and the processing circuit is triggered to perform operations each time when the timer expires, and wherein before a random number is generated, the processing circuit is further configured to:

determine whether a flag variable is ON, wherein the flag variable is initialized to be ON each time when the timer expires, and the random number is generated in a case that the flag variable is ON.

10. The user equipment according to claim 9, wherein the processing circuit is further configured to flag the flag variable as OFF in a case that there is no feedback signal which is not decoded correctly.

11. The user equipment according to claim 6, wherein the processing circuit is further configured to:

select a resource block from a resource pool of the wireless communication system randomly;

monitor the randomly selected resource block;

cause the transceiver to receive the plurality of feedback signals transmitted via the randomly selected resource block by the receiving end user equipment performing the D2D communication in the wireless communication system;

identify the D2D link where the receiving end user equipment is located as a neighbor D2D link of the transmitting end user equipment, based on the identification information in the feedback signal that is decoded correctly; and cause the transceiver to transmit the identified neighbor D2D link to a base station in the wireless communication system.

12. The user equipment according to claim 11, wherein the processing circuit is configured to cause the transceiver to repeatedly transmit the beacon signal to the receiving end user equipment performing the D2D communication in the wireless communication system, in response to determination that there is the feedback signal that is not decoded correctly.

13. A base station for performing D2D communication in a wireless communication system, the wireless communication system comprising a plurality of D2D links, the base station comprising:

a transceiver; and one or more processing circuits configured to:

cause the transceiver to receive a neighbor D2D link of each receiving end user equipment identified by the receiving end user equipment of each of the plurality of D2D links;

determine a neighbor D2D link of each of the plurality of D2D links based on the received neighbor D2D link of each receiving end user equipment and a determination of whether the received neighbor D2D link includes a beacon signal that can be correctly decoded; and configure, based on the neighbor D2D link of each of the plurality of D2D links, resources for the receiving end user equipment and a transmitting end user equipment of each of the plurality of D2D links, for the D2D communication.

14. The base station according to claim 13, wherein the processing circuit is further configured to:

cause the transceiver to receive a neighbor D2D link of each transmitting end user equipment identified by the transmitting end user equipment of each of the plurality of D2D links;

determine a neighbor D2D link of each of the plurality of D2D links based on the received neighbor D2D link of each receiving end user equipment and the received neighbor D2D link of each transmitting end user equipment; and configure, based on the neighbor D2D link of each of the plurality of D2D links, resources for the receiving end user equipment and the transmitting end user equipment of each of the D2D links, for the D2D communication.

15. The based station according to claim 13, wherein in the process of configuring resources for the receiving end user equipment and the transmitting end user equipment of each of the plurality of D2D links, the processing circuit is further configured to configure resources so that the D2D link does not transmit information simultaneously with the neighbor D2D link of the D2D link.

16. The base station according to claim 15, wherein in the process of configuring resources for the receiving end user equipment and the transmitting end user equipment of each of the plurality of D2D links, the processing circuit is further configured to configure resources so that the D2D link transmits information simultaneously with other D2D links than the neighbor D2D link of the D2D link.

17. The base station according to claim 13, wherein the wireless communication system comprises a plurality of base stations, and each of the plurality of D2D links comprises a transmitting end user equipment and a receiving end user equipment.

18. A method for performing D2D communication in a wireless communication system, the wireless communication system comprising a plurality of D2D links, the method comprising:

receiving a plurality of beacon signals transmitted by a transmitting end user equipment performing the D2D communication in the wireless communication system, and decoding the received beacon signals, wherein each of the beacon signals comprises identification information for identifying a D2D link where the transmitting end user equipment is located;

identifying, among the plurality of beacon signals, a beacon signal that is decoded correctly;

determining whether there is a beacon signal among the plurality of beacon signals that is not decoded correctly and, if so, identifying the beacon signal that is not decoded correctly;

identifying the D2D link where the transmitting end user equipment is located as a neighbor D2D link of a receiving end user equipment, based on the identification information in the beacon signal that is decoded correctly; and transmitting the identified neighbor D2D link to a base station in the wireless communication system.

19. A method for performing D2D communication in a wireless communication system, the wireless communication system comprising a plurality of D2D links, the method comprising:

transmitting a beacon signal to a receiving end user equipment performing the D2D communication in the wireless communication system, wherein the beacon signal comprises identification information for identifying a D2D link where a transmitting end user equipment is located;

causing the transceiver to receive a plurality of feedback signals transmitted by the receiving end user equipment performing the D2D communication in the wireless communication system, and decode the plurality of received feedback signals, wherein each of the feedback signals comprises identification information for identifying a D21) link where the receiving end user equipment is located;

identifying, among, the plurality of feedback signals, a feedback signal that is decoded correctly; and determining whether there is a feedback signal among the plurality of feedback signals that is not decoded correctly and, if so, identifying, the feedback signal that is not decoded correctly.

20. A method for performing D2D communication in a wireless communication system, the wireless communication system comprising a plurality of D2D links, the method comprising:

receiving a neighbor D2D link of each receiving end user equipment identified by the receiving end user equipment of each of the D2D links;

determining a neighbor D2D link of each of the plurality of D2D links based on the received neighbor D2D link of each receiving end user equipment and a determination of whether the received neighbor D2D link includes a beacon signal that can be correctly decoded; and configuring, based on the neighbor D2D link of each of the plurality of D2D links, resources for the receiving end user equipment and a transmitting end user equipment of each of the plurality of D2D links, for the D2D communication.

* * * * *